United States Patent
Howard et al.

(10) Patent No.: US 7,174,432 B2
(45) Date of Patent: Feb. 6, 2007

(54) ASYNCHRONOUS, INDEPENDENT AND MULTIPLE PROCESS SHARED MEMORY SYSTEM IN AN ADAPTIVE COMPUTING ARCHITECTURE

(75) Inventors: Ric Howard, San Jose, CA (US); Ramana V. Katragadda, Carlsbad, CA (US)

(73) Assignee: NVIDIA Corporation, Santa Clara, CA (US)

( * ) Notice: Subject to any disclaimer, the term of this patent is extended or adjusted under 35 U.S.C. 154(b) by 446 days.

(21) Appl. No.: 10/644,621

(22) Filed: Aug. 19, 2003

(65) Prior Publication Data

US 2005/0044327 A1 Feb. 24, 2005

(51) Int. Cl.
*G06F 12/00* (2006.01)
*G06F 9/00* (2006.01)

(52) U.S. Cl. .................. 711/147; 711/154; 711/149; 711/218; 710/52; 365/221

(58) Field of Classification Search ............. 711/147, 711/154, 149, 110, 218; 710/52; 365/221
See application file for complete search history.

(56) References Cited

U.S. PATENT DOCUMENTS

| | | | | |
|---|---|---|---|---|
| 6,134,629 | A | * | 10/2000 | L'Ecuyer .................... 711/110 |
| 6,807,590 | B1 | * | 10/2004 | Carlson et al. ............... 710/57 |
| 2003/0131162 | A1 | * | 7/2003 | Secatch et al. ............... 710/52 |

\* cited by examiner

*Primary Examiner*—Kimberly McLean-Mayo
(74) *Attorney, Agent, or Firm*—Patterson & Sheridan, L.L.P.

(57) ABSTRACT

The present invention provides a system and method for implementation and use of a shared memory. The shared memory may be accessed both independently and asynchronously by one or more processes at corresponding nodes, allowing data to be streamed to multiple processes and nodes without regard to synchronization of the plurality of processes. The various nodes may be adaptive computing nodes, kernel or controller nodes, or one or more host processor nodes. The present invention maintains memory integrity, not allowing memory overruns, underruns, or deadlocks. The present invention also provides for "push back" after a memory read, for applications in which it is desirable to "unread" some elements previously read from the memory.

45 Claims, 27 Drawing Sheets

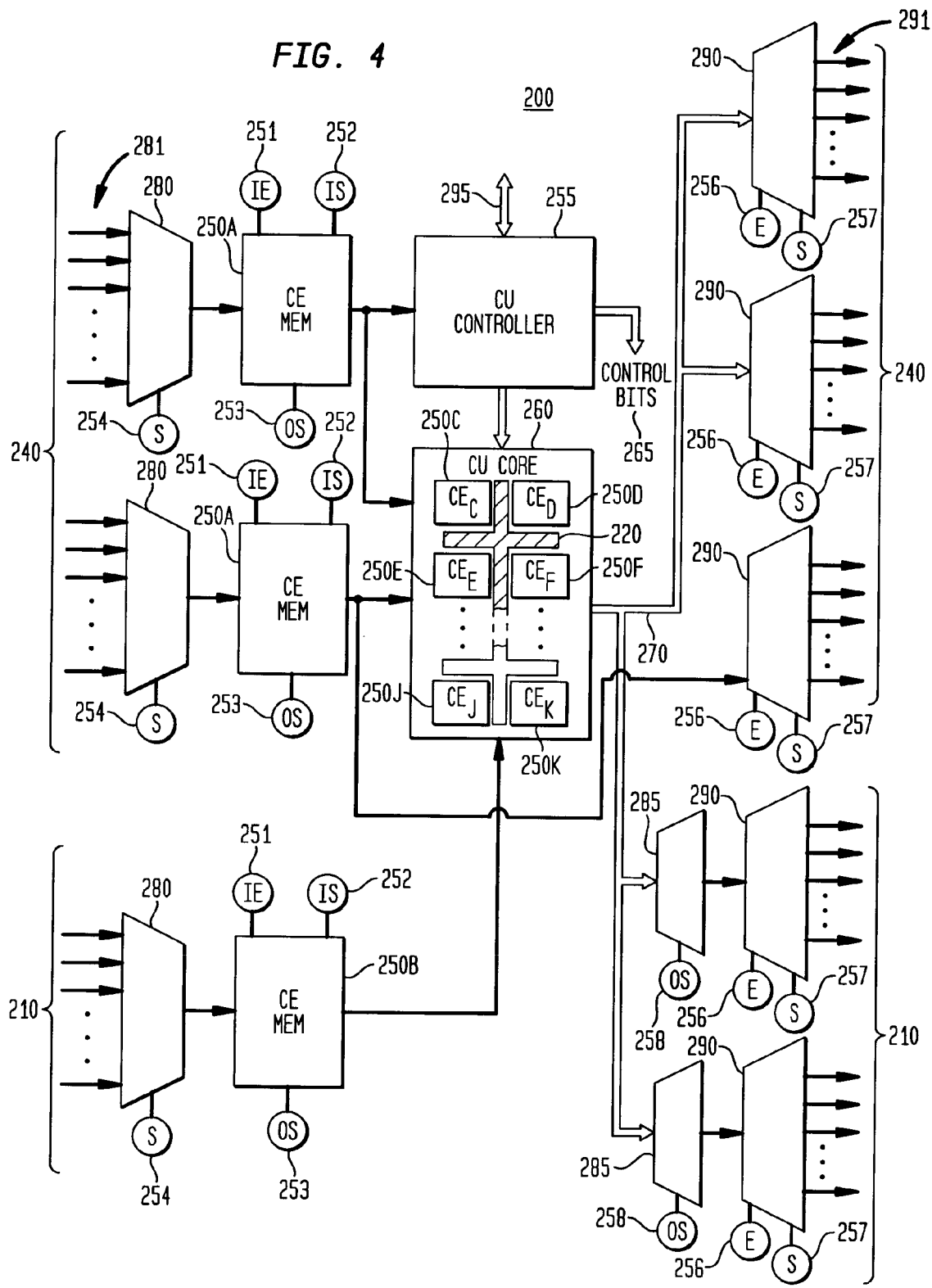

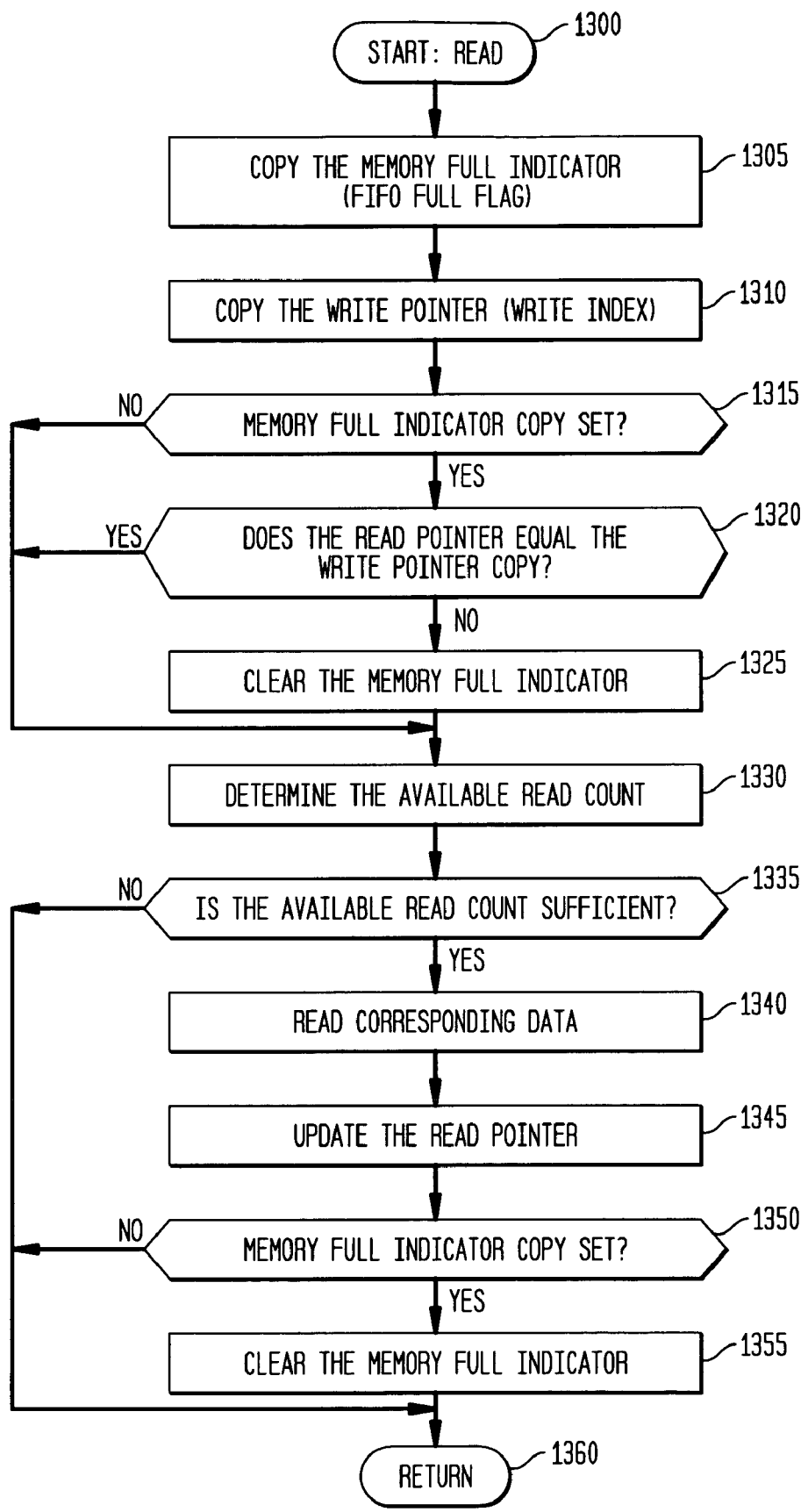

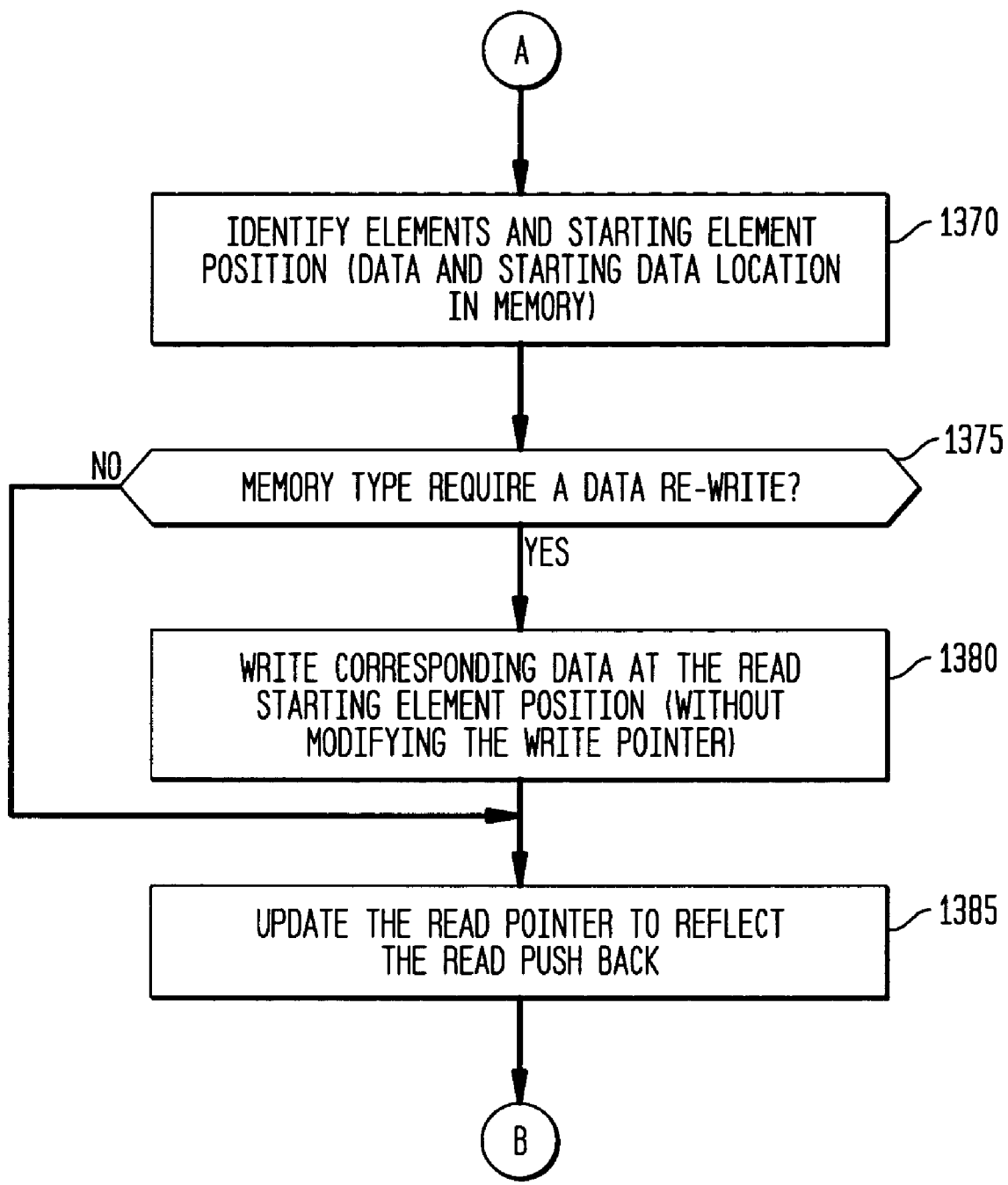

ASYNCHRONOUS, INDEPENDENT AND MULTIPLE PROCESS SHARED MEMORY SYSTEM IN AN ADAPTIVE COMPUTING ARCHITECTURE

CROSS-REFERENCE TO A RELATED APPLICATION

This application is related to a Paul L. Master et al., U.S. patent application Ser. No. 10/384,486, entitled "Adaptive Integrated Circuitry With Heterogeneous And Reconfigurable Matrices Of Diverse And Adaptive Computational Units Having Fixed, Application Specific Computational Elements", filed Mar. 7, 2003, commonly assigned to Quick-Silver Technology, Inc., and incorporated by reference herein, with priority claimed for all commonly disclosed subject matter (the "related application"), which is a continuation-in-part of Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to QuickSilver Technology, Inc.

FIELD OF THE INVENTION

The present invention relates, in general, to memory management for integrated circuits and systems, and more particularly, to management of shared memory resources which are accessible independently and asynchronously by multiple processes in an adaptive computing integrated circuit architecture.

BACKGROUND OF THE INVENTION

The related application discloses a new form or type of integrated circuit, referred to as an adaptive computing engine ("ACE"), which is readily reconfigurable, in real time, and is capable of having corresponding, multiple modes of operation.

The ACE architecture for adaptive or reconfigurable computing, includes a plurality of different or heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real time to adapt (configure and reconfigure) the plurality of heterogeneous computational elements for a plurality of different functional modes, including linear algorithmic operations, non-linear algorithmic operations, finite state machine operations, memory operations, and bit-level manipulations.

The ACE architecture utilizes a data flow model for processing. More particularly, input operand data will be processed to produce output data (without other intervention such as interrupt signals, instruction fetching, etc.), whenever the input data is available and an output port (register or buffer) is available for any resulting output data. Controlling the data flow processing to implement an algorithm, however, presents unusual difficulties, including for controlling data flow in the communication and control algorithms used in wideband CDMA ("WCDMA") and cdma2000.

One aspect of data flow control is memory management, where a given memory, such as a First In-First Out ("FIFO") memory, is shared by or across multiple processes. In such a shared arrangement, each process may access the memory, such as to read or write data. In the prior art, however, to avoid conflict in memory usage by these various processes, a "mutual exclusion" is implemented, either in hardware or software. With such a mutual exclusion, when one process is utilizing the shared memory, all other processes are excluded or "locked out" from accessing the shared memory.

Such mutual exclusion memory management, however, typically requires additional steps, additional instructions, or additional circuitry for a process to access the shared memory. As a consequence, such prior art memory management results in slower memory access, which is unsuitable for high speed operations.

SUMMARY OF THE INVENTION

The present invention provides a system and method for implementation and use of a shared memory. The shared memory may be accessed both independently and asynchronously by one or more processes, allowing data to be streamed to multiple processes without regard to synchronization of the plurality of processes. The present invention maintains memory integrity, not allowing memory overruns, underruns, or deadlocks. The present invention also provides for "push back" after a memory read, for applications in which it is desirable to "unread" some elements previously read from the memory.

A system embodiment for controlling independent and asynchronous access to a memory by a plurality of processes, in accordance with the present invention, includes a memory and one or more nodes coupled to the memory, such as adaptive computing nodes, kernel or controller nodes, or one or more host processor nodes, and are referred to as a first node and a second node. The first node is capable of independently and asynchronously performing a read operation, while the second node is capable of independently and asynchronously performing a write operation.

More particularly, the first node obtains a first copy of a memory full indicator and a copy of a write index, which indicates a write element position in the memory; determines an available read count from the write index copy and a read index, which indicates a read element position in the memory; and beginning at the read element position, the first node reads a plurality of data elements corresponding to the available read count. For a "push back" read process, the first node selects a subset of data elements from the plurality of data elements for a subsequent read process and determines an element position corresponding to an initial data element of the subset of data elements in the memory, as a next read element position and as a next write element position. For stored data which may have been destroyed during the read process, commencing at the next write element position, the first node writes (as a re-write) the subset of data elements to the memory. For a read process or a "push back" read process, the first node then updates the read index to indicate the next read element position and, when the first copy of the memory full indicator indicates that the memory is full or may be full, clears the memory full indicator to indicate that the memory is not full.

Also, the second node independently and asynchronously obtains a second copy of a memory full indicator and a copy of the read index. When the second copy of the memory full indicator indicates that the memory is not full, the second node determines an available write count from the read index copy and the write index; and beginning at the write element position indicated by the write index, writes an amount of data corresponding to the available write count. The second node updates the write index to indicate a next write element position based upon the amount of data written; and when the updated write index is equal to the read index copy, sets the memory full indicator to indicate that the memory is full or may be full.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a block diagram illustrating, in greater detail, a computational unit of a reconfigurable matrix.

FIG. 18 is a flow diagram illustrating an exemplary data reading operation in accordance with the present invention.

FIG. 19, divided into FIG. 19A and FIG. 19B, is a flow diagram illustrating an exemplary memory read and rewrite process in accordance with the present invention.

DETAILED DESCRIPTION OF THE INVENTION

Figure 1:
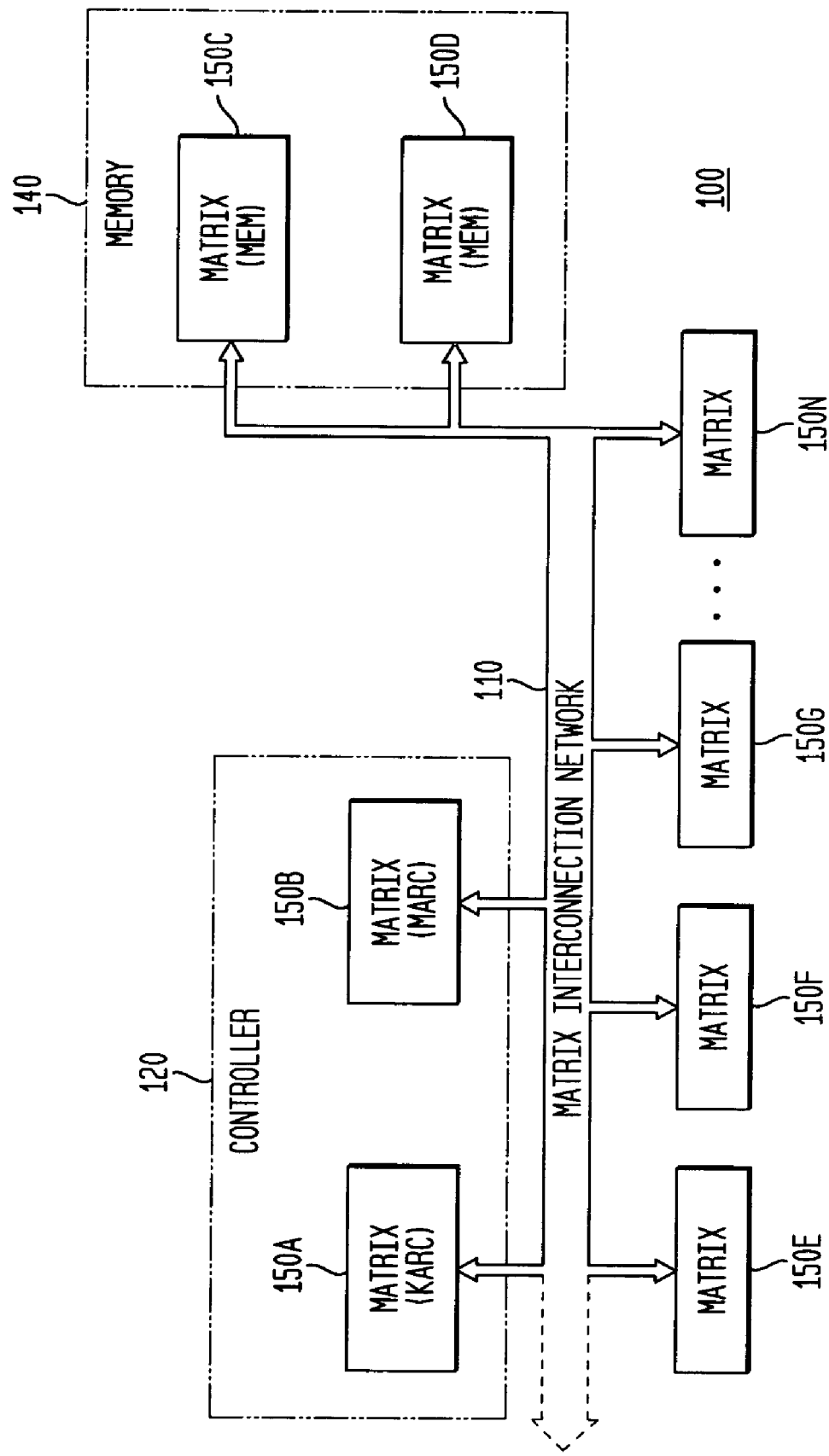
FIG. 1 is a block diagram illustrating an exemplary first apparatus embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, the present invention provides a system and method for implementation and use of a shared memory, such as a First In-First Out (FIFO) buffer or memory, in an adaptive computing architecture. In accordance with the present invention, the shared memory may be accessed both independently and asynchronously by one or more processes, allowing data to be streamed to multiple processes without regard to synchronization of the plurality of processes. The present invention also provides for "push back" after a memory read, for applications in which it is desirable to "unread" some elements previously read from the memory 1100, referred to as a memory (or FIFO) read and rewrite process (or push back).

FIG. 1 is a block diagram illustrating a first apparatus 100 embodiment in accordance with the present invention. The apparatus 100, referred to herein as an adaptive computing engine ("ACE") 100, is preferably embodied as an integrated circuit, or as a portion of an integrated circuit having other, additional components. In the first apparatus embodiment, and as discussed in greater detail below, the ACE 100 includes one or more reconfigurable matrices (or nodes) 150, such as matrices 150A through 150N as illustrated, and a matrix interconnection network 110. Also in the first apparatus embodiment, and as discussed in detail below, one or more of the matrices (nodes) 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, direct memory access (DMA), random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the first apparatus embodiment, the memory 140 is included within the ACE 100, and preferably is comprised of computational elements which are low power consumption random access memory (RAM), but also may be comprised of computational elements of any other form of memory, such as flash, DRAM, SRAM, SDRAM, FRAM, MRAM, ROM, EPROM or E²PROM. In the first apparatus embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module. The kernel controller is also referred to as a "K-node", discussed in greater detail below with reference to FIGS. 10 and 11.

Figure 3:
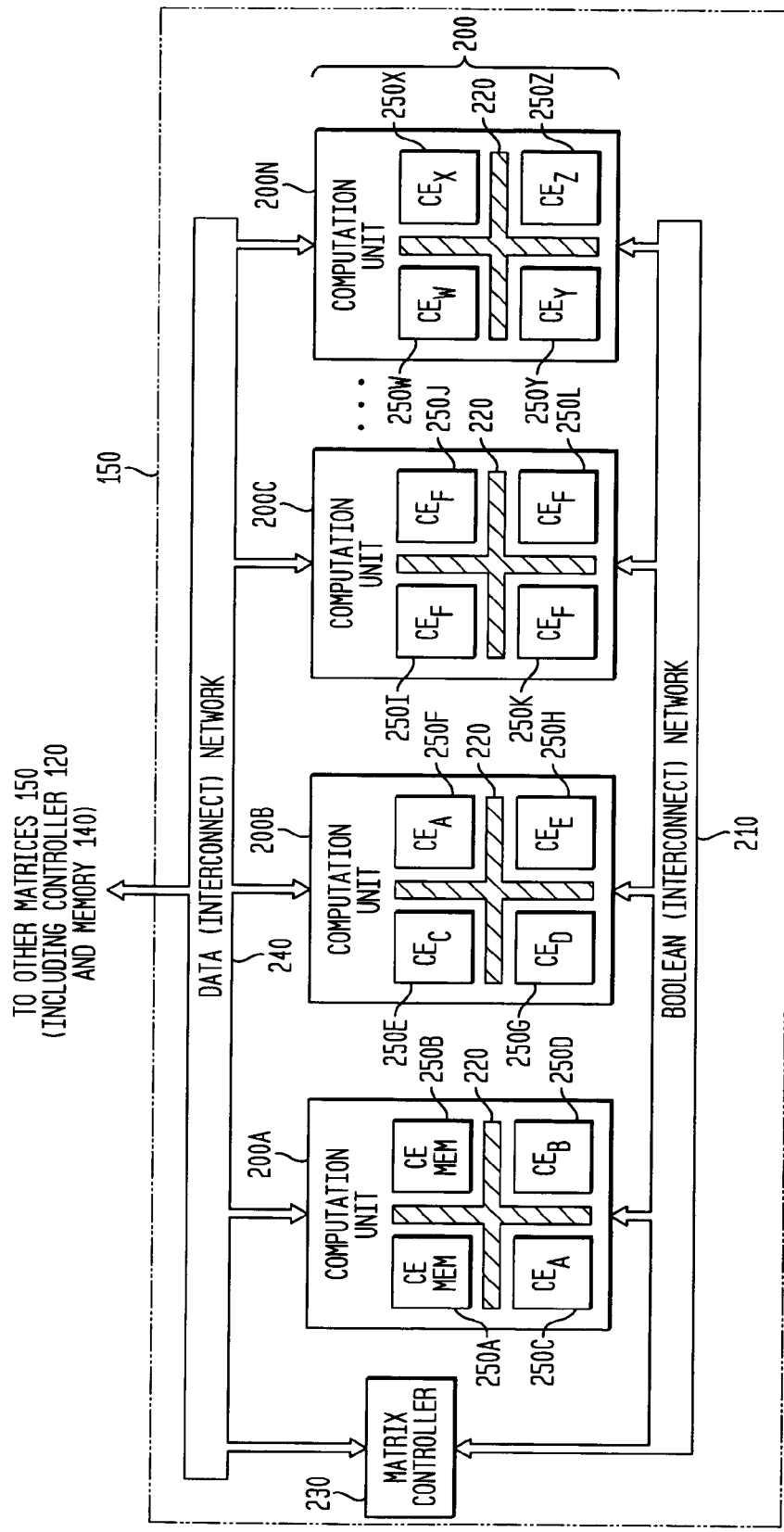
FIG. 3 is a block diagram illustrating a reconfigurable matrix (or node), a plurality of computation units, and a plurality of computational elements.

The matrix interconnection network ("MIN") 110 of FIG. 1, and its subset interconnection networks separately illustrated in FIGS. 3 and 4 (Boolean interconnection network 210, data interconnection network 240, and interconnect 220), individually, collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the first apparatus embodiment, the various interconnection networks are implemented as described, for example, in U.S. Pat. Nos. 5,218,240, 5,336,950, 5,245,227, and 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses. In the second apparatus embodiment, the various interconnection networks are implemented as described below with reference to FIGS. 12 and 13, using various combinations of routing elements, such as token rings or arbiters, and multiplexers, at varying levels within the system and apparatus embodiments of the present invention.

It should be pointed out, however, that while any given level of switching or selecting operation of or within the various interconnection networks (110, 210, 240 and 220) may be implemented as known in the art, the combinations of routing elements and multiplexing elements, the use of different routing elements and multiplexing elements at differing levels within the system, and the design and layout of the various interconnection networks (110, 210, 240 and 220), are new and novel, as discussed in greater detail below.

For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real time operation of the ACE 100 and its inherent advantages.

The first novel concepts concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 3) of the matrices 150, such as pluralities of multipliers, complex multipliers, and adders, each of which are designed for optimal execution of corresponding multiplication, complex multiplication, and addition functions. Given that the ACE 100 is to be optimized, in the first apparatus embodiment, for low power consumption, the functions for acceleration are selected based upon power consumption. For example, for a given application such as mobile communication, corresponding C (C# or C++) or other code may be analyzed for power consumption. Such empirical analysis may reveal, for example, that a small portion of such code, such as 10%, actually consumes 90% of the operating power when executed. On the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 3, other functionality, such as control code, may be accelerated within matrices 150 when configured as finite state machines.

Figure 2:
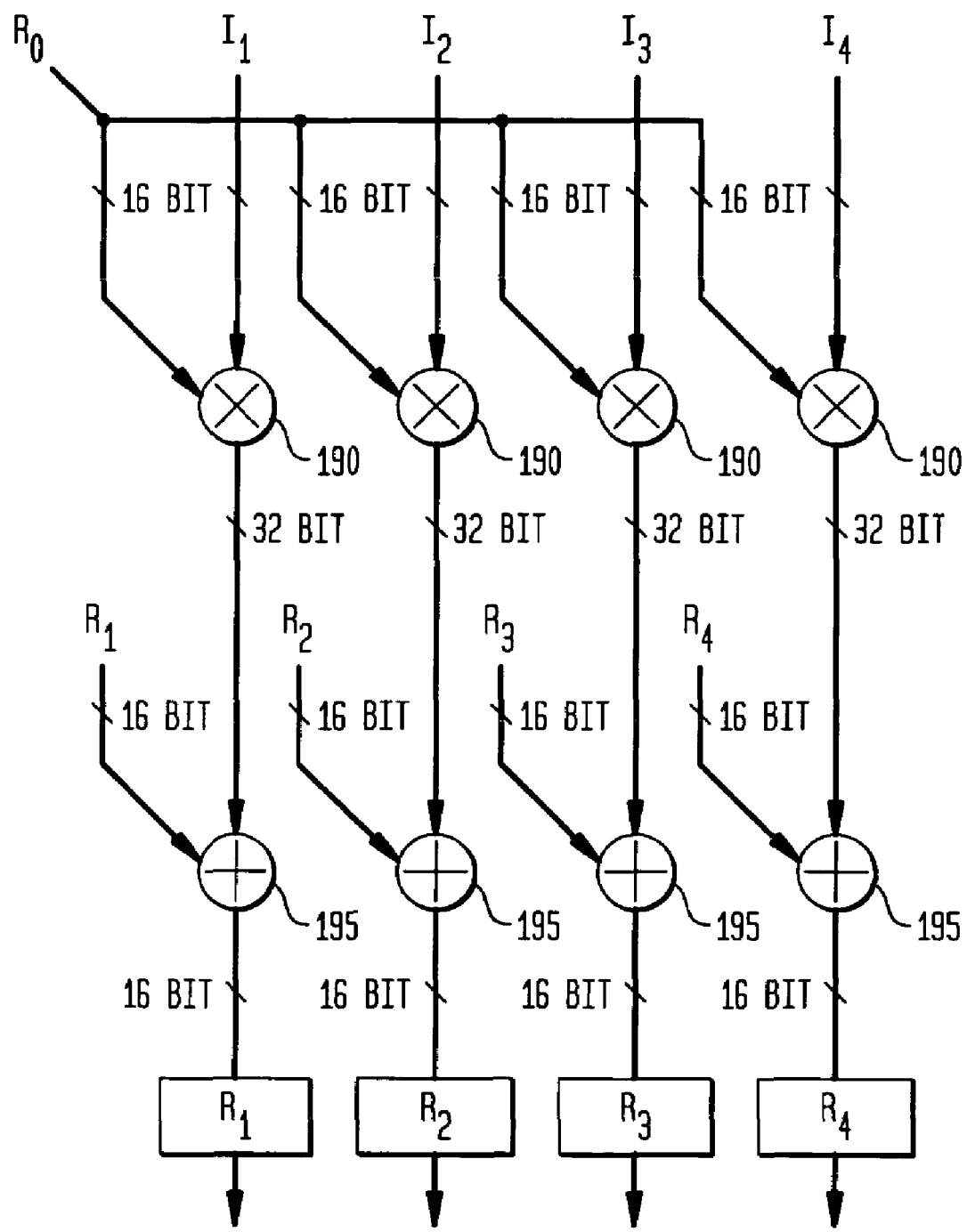
FIG. 2 is a schematic diagram illustrating an exemplary data flow graph.

Next, the ACE 100 utilizes a data flow model for all processes and computations. Algorithms or other functions selected for acceleration may be converted into a form which may be represented as a "data flow graph" ("DFG"). A schematic diagram of an exemplary data flow graph is illustrated in FIG. 2. As illustrated in FIG. 2, an algorithm or function useful for CDMA voice coding (QCELP (Qualcomm code excited linear prediction)) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real time which is optimized to perform the particular algorithm. Continuing with the exemplary DFG or FIG. 2, four fixed or dedicated multipliers, as computational elements 250, and four fixed or dedicated adders, also as different computational elements 250, are configured in real time through the interconnect to perform the functions or algorithms of the particular DFG. Using this data flow model, data which is produced, such as by the multipliers 190, is immediately consumed, such as by adders 195.

The third and perhaps most significant concept, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, within computation units 200, different computational elements (250) are implemented directly as correspondingly different fixed (or dedicated) application specific hardware, such as dedicated multipliers, complex multipliers, accumulators, arithmetic logic units (ALUs), registers, and adders. Utilizing interconnect (210 and 220), these differing, heterogeneous computational elements (250) may then be adaptively configured, in real time, to perform the selected algorithm, such as the performance of discrete cosine transformations often utilized in mobile communications. For the data flow graph example of FIG. 2, four multipliers and four adders will be configured, i.e., connected in real time, to perform the particular algorithm. As a consequence, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 100 may co-evolve and be reconfigured to implement the new algorithm. For a simplified example, a fifth multiplier and a fifth adder may be incorporated into the DFG of FIG. 2 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between adaptation (configuration and reconfiguration), on the one hand, and programming or reprogrammability, on the other hand. Typical programmability utilizes a pre-existing group or set of functions, which may be called in various orders, over time, to implement a particular algorithm. In contrast, configurability and reconfigurability (or adaptation), as used herein, includes the additional capability of adding or creating new functions which were previously unavailable or non-existent.

Next, the present and related inventions also utilize a tight coupling (or interdigitation) of data and configuration (or other control) information, within one, effectively continuous stream of information. This coupling or commingling of data and configuration information, referred to as a "silverware" module, is the subject of a separate, related patent application. For purposes of the present invention, however, it is sufficient to note that this coupling of data and configuration information into one information (or bit) stream helps to enable real time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 1, the functions of the controller 120 (preferably matrix (KARC) 150A and matrix (MARC) 150B, configured as finite state machines) may be explained: (1) with reference to a silverware module, namely, the tight coupling of data and configuration information within a single stream of information; (2) with reference to multiple potential modes of operation; (3) with reference to the reconfigurable matrices 150; and (4) with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the first apparatus embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the first apparatus embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100. Additional functions of the kernel controller, as a K-node, are discussed in greater detail below.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the first apparatus embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150. This matrix control functionality may also be combined with kernel control, such as in the K-node, discussed below.

FIG. 3 is a block diagram illustrating, in greater detail, a reconfigurable matrix (or node) 150 with a plurality of computation units 200 (illustrated as computation units 200A through 200N), and a plurality of computational elements 250 (illustrated as computational elements 250A through 250Z), and provides additional illustration of the exemplary types of computational elements 250 and a useful summary. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The matrix controller 230 may also be implemented as a hardware task manager, discussed below with reference to FIG. 10. As mentioned above, in the first apparatus embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality. It should also be noted that other, exemplary forms of interconnect are discussed in greater detail below with reference to FIGS. 11–13.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 2, utilizing the interconnect 220, the Boolean network 210, and the matrix interconnection network 110. For example, using the multiplexing or routing capabilities discussed below, the inputs/outputs of a computational element 250 may be coupled to outputs/inputs of a first set of (other) computational elements 250, for performance of a first function or algorithm, and subsequently adapted or reconfigured, such that these inputs/outputs are coupled to outputs/inputs of a second set of (other) computational elements 250, for performance of a second function or algorithm.

In the first apparatus embodiment, the various computational elements 250 are designed and grouped together, into the various adaptive and reconfigurable computation units 200 (as illustrated, for example, in FIGS. 5A through 9). In addition to computational elements 250 which are designed to execute a particular algorithm or function, such as multiplication or addition, other types of computational elements 250 are also utilized in the first apparatus embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing, and which may be utilized within the hardware task manager, discussed below.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIGS. 5A through 5E and FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

In the first apparatus embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

As indicated above, the plurality of heterogeneous computational elements 250 may be configured and reconfigured, through the levels of the interconnect network (110, 210, 220, 240), for performance of a plurality of functional or operational modes, such as linear operations, non-linear operations, finite state machine operations, memory and memory management, and bit-level manipulation. This configuration and reconfiguration of the plurality of heterogeneous computational elements 250 through the levels of the interconnect network (110, 210, 220, 240), however, may be conceptualized on another, higher or more abstract level, namely, configuration and reconfiguration for the performance of a plurality of algorithmic elements.

At this more abstract level of the algorithmic element, the performance of any one of the algorithmic elements may be considered to require a simultaneous performance of a plurality of the lower-level functions or operations, such as move, input, output, add, subtract, multiply, complex multiply, divide, shift, multiply and accumulate, and so on, using a configuration (and reconfiguration) of computational elements having a plurality of fixed architectures such as memory, addition, multiplication, complex multiplication, subtraction, synchronization, queuing, over sampling, under sampling, adaptation, configuration, reconfiguration, control, input, output, and field programmability.

When such a plurality of fixed architectures are configured and reconfigured for performance of an entire algorithmic element, this performance may occur using comparatively few clock cycles, compared to the orders of magnitude more clock cycles typically required. The algorithmic elements may be selected from a plurality of algorithmic elements comprising, for example: a radix-2 Fast Fourier Transformation (FFT), a radix-4 Fast Fourier Transformation (FFT), a radix-2 inverse Fast Fourier Transformation (IFFT), a radix-4 IFFT, a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation. Numerous other algorithmic element examples are discussed in greater detail below with reference to FIG. 10.

In another embodiment of the ACE 100, one or more of the matrices (or nodes) 150 may be designed to be application specific, having a fixed architecture with a corresponding fixed function (or predetermined application), rather than being comprised of a plurality of heterogeneous computational elements which may be configured and reconfigured for performance of a plurality of operations, functions, or algorithmic elements. For example, an analog-to-digital (A/D) or digital-to-analog (D/A) converter may be implemented without adaptive capability. As discussed in greater detail below, common node (matrix) functions also may be implemented without adaptive capability, such as the node wrapper functions discussed below. Under various circumstances, however, the fixed function node may be capable of parameter adjustment for performance of the predetermined application. For example, the parameter adjustment may comprise changing one or more of the following parameters: a number of filter coefficients, a number of parallel input bits, a number of parallel output bits, a number of selected points for Fast Fourier Transformation, a number of bits of precision, a code rate, a number of bits of interpolation of a trigonometric function, and real or complex number valuation. This fixed function node (or matrix) 150, which may be parametizable, will typically be utilized in circumstances where an algorithmic element is used on a virtually continuous basis, such as in certain types of communications or computing applications.

For example, the fixed function node 150 may be a microprocessor (such as a RISC processor), a digital signal processor (DSP), a co-processor, a parallel processor, a controller, a microcontroller, a finite state machine, and so on (with the term "processor" utilized herein to individually or collectively refer, generally and inclusively, to any of the types of processors mentioned above and their equivalents), and may or may not have an embedded operating system. Such a controller or processor fixed function node 150 may be utilized for the various KARC 150A or MARC 150B applications mentioned above, such as providing configuration information to the interconnection network, directing and scheduling the configuration of the plurality of heterogeneous computational elements 250 of the other nodes 150 for performance of the various functional modes or algorithmic elements, or timing and scheduling the configuration and reconfiguration of the plurality of heterogeneous computational elements with corresponding data. In other applications, also for example, the fixed function node may be a cascaded integrated comb (CIC) filter or a parameterized, cascaded integrated comb (CIC) filter; a finite impulse response (FIR) filter or a finite impulse response (FIR) filter parameterized for variable filter length; or an A/D or D/A converter.

FIG. 4 is a block diagram illustrating, in greater detail, an exemplary or representative computation unit 200 of a reconfigurable matrix 150. As illustrated in FIG. 4, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the first apparatus embodiment, the selection of various input and output lines 281 and 291, and the creation of various connections through the interconnect (210, 220 and 240), is under control of control bits 265 from a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 255 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

FIGS. 5A through 5E are block diagrams illustrating, in detail, exemplary fixed and specific computational elements, forming computational units. As will be apparent from review of these Figures, many of the same fixed computational elements are utilized, with varying configurations, for the performance of different algorithms.

Figure 5A:
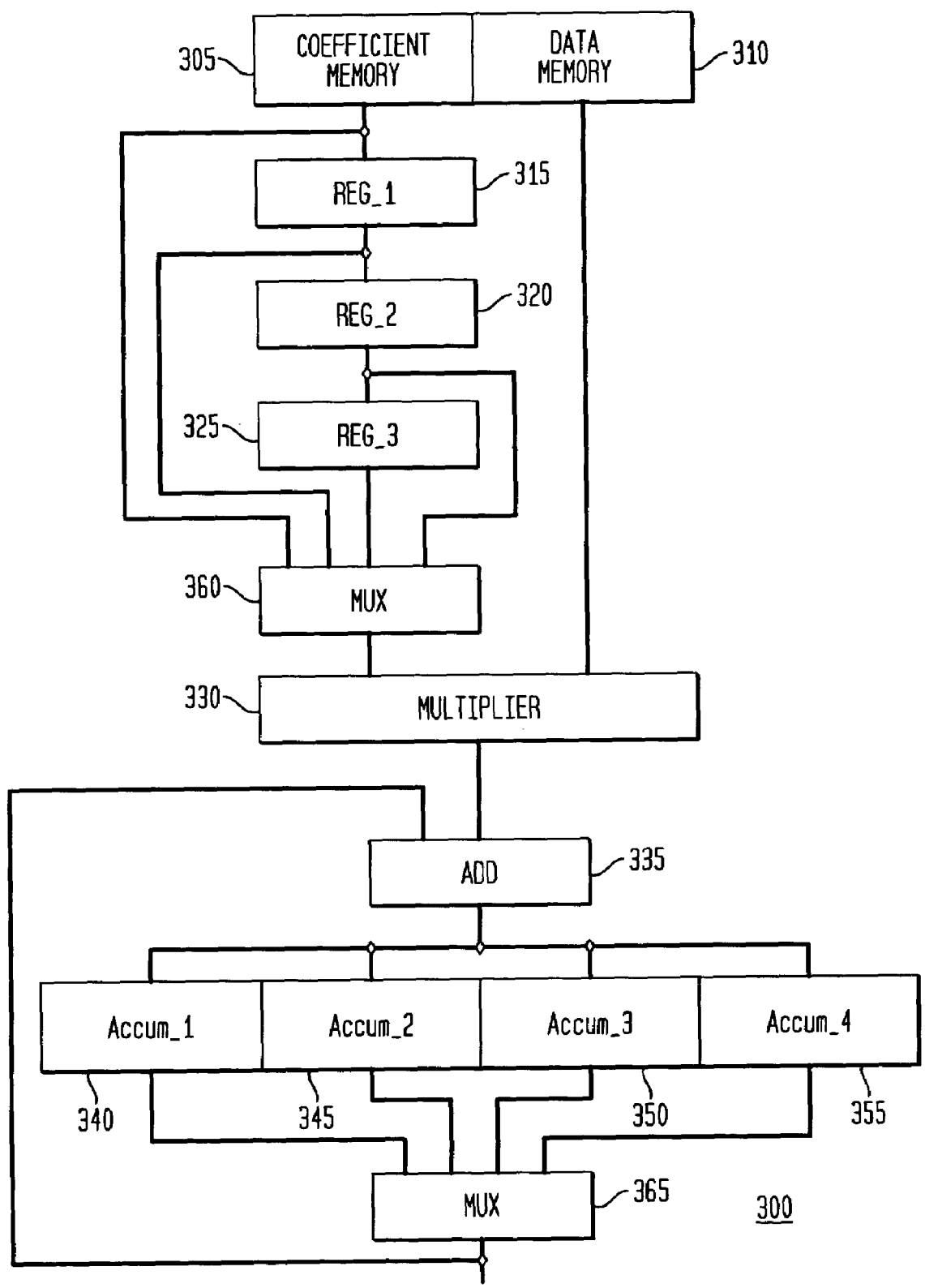
FIGS. 5A through 5E are block diagrams illustrating, in detail, exemplary fixed and specific computational elements, forming computational units.

FIG. 5A is a block diagram illustrating a four-point asymmetric finite impulse response (FIR) filter computational unit 300. As illustrated, this exemplary computational unit 300 includes a particular, first configuration of a plurality of fixed computational elements, including coefficient memory 305, data memory 310, registers 315, 320 and 325, multiplier 330, adder 335, and accumulator registers 340, 345, 350 and 355, with multiplexers (MUXes) 360 and 365 forming a portion of the interconnection network (210, 220 and 240).

Figure 5B:
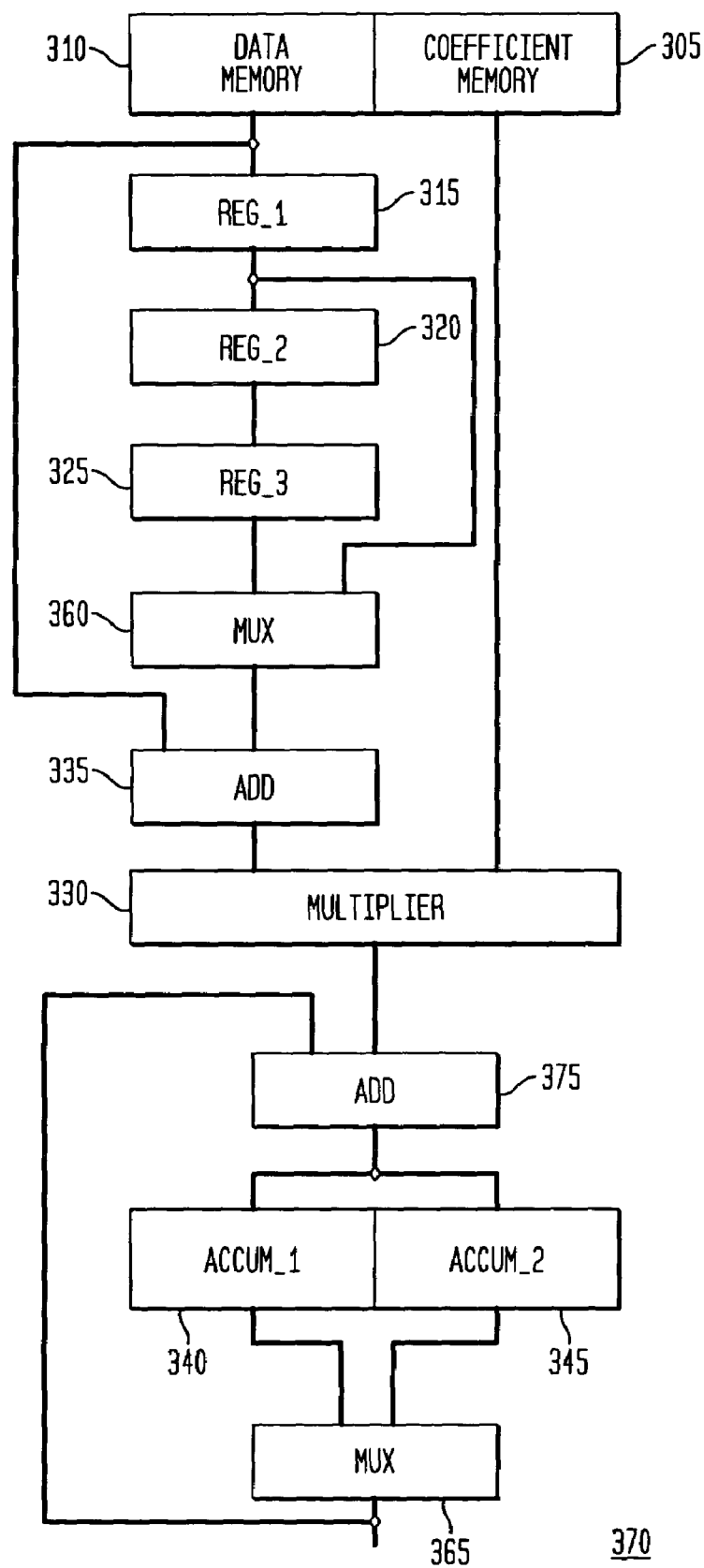

FIG. 5B is a block diagram illustrating a two-point symmetric finite impulse response (FIR) filter computational unit 370. As illustrated, this exemplary computational unit 370 includes a second configuration of a plurality of fixed computational elements, including coefficient memory 305, data memory 310, registers 315, 320 and 325, multiplier 330, adder 335, second adder 375, and accumulator registers 340 and 345, also with multiplexers (MUXes) 360 and 365 forming a portion of the interconnection network (210, 220 and 240).

Figure 5C:
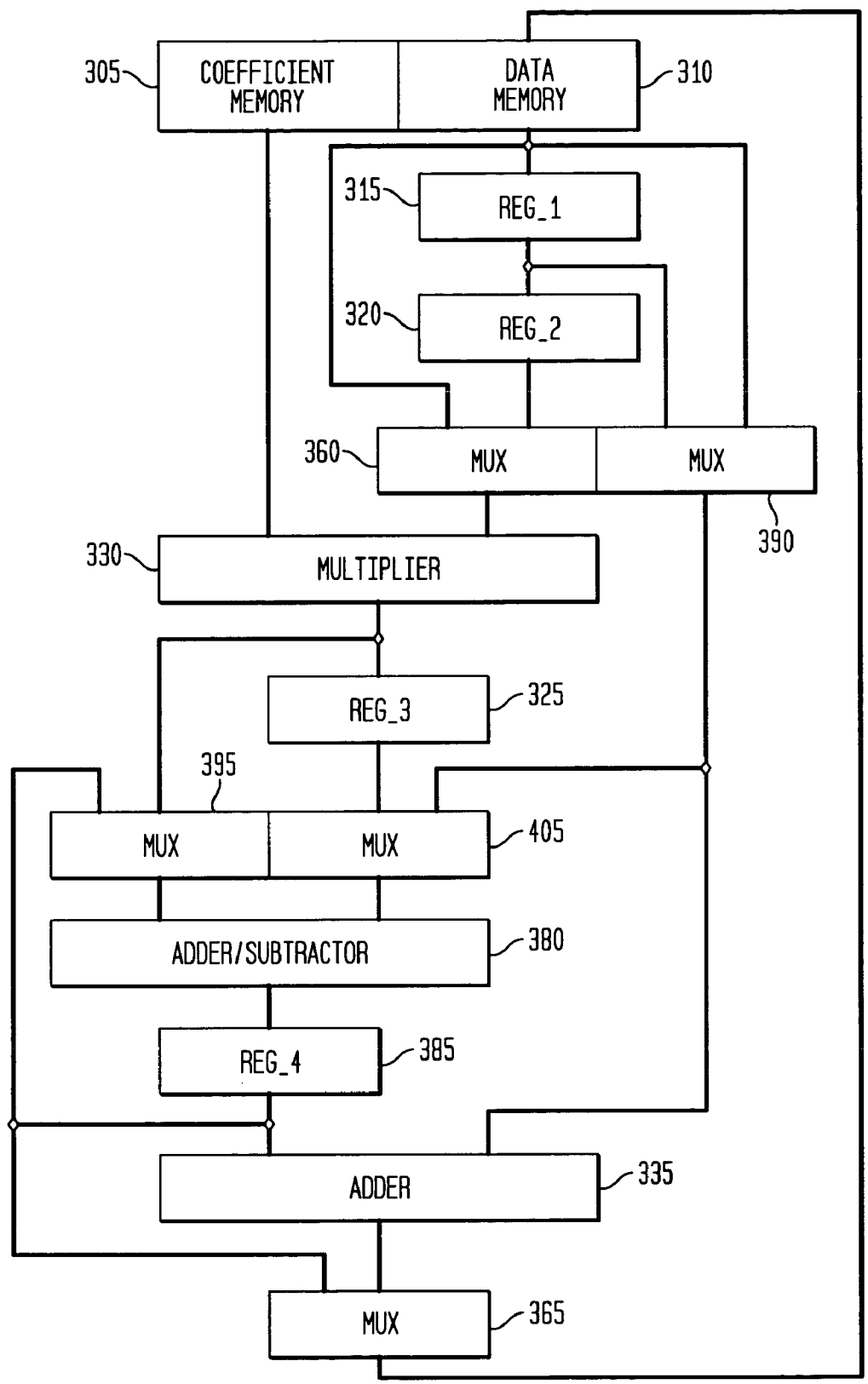

FIG. 5C is a block diagram illustrating a subunit for a fast Fourier transform (FFT) computational unit 400. As illustrated, this exemplary computational unit 400 includes a third configuration of a plurality of fixed computational elements, including coefficient memory 305, data memory 310, registers 315, 320, 325 and 385, multiplier 330, adder 335, and adder/subtracter 380, with multiplexers (MUXes) 360, 365, 390, 395 and 405 forming a portion of the interconnection network (210, 220 and 240).

Figure 5D:
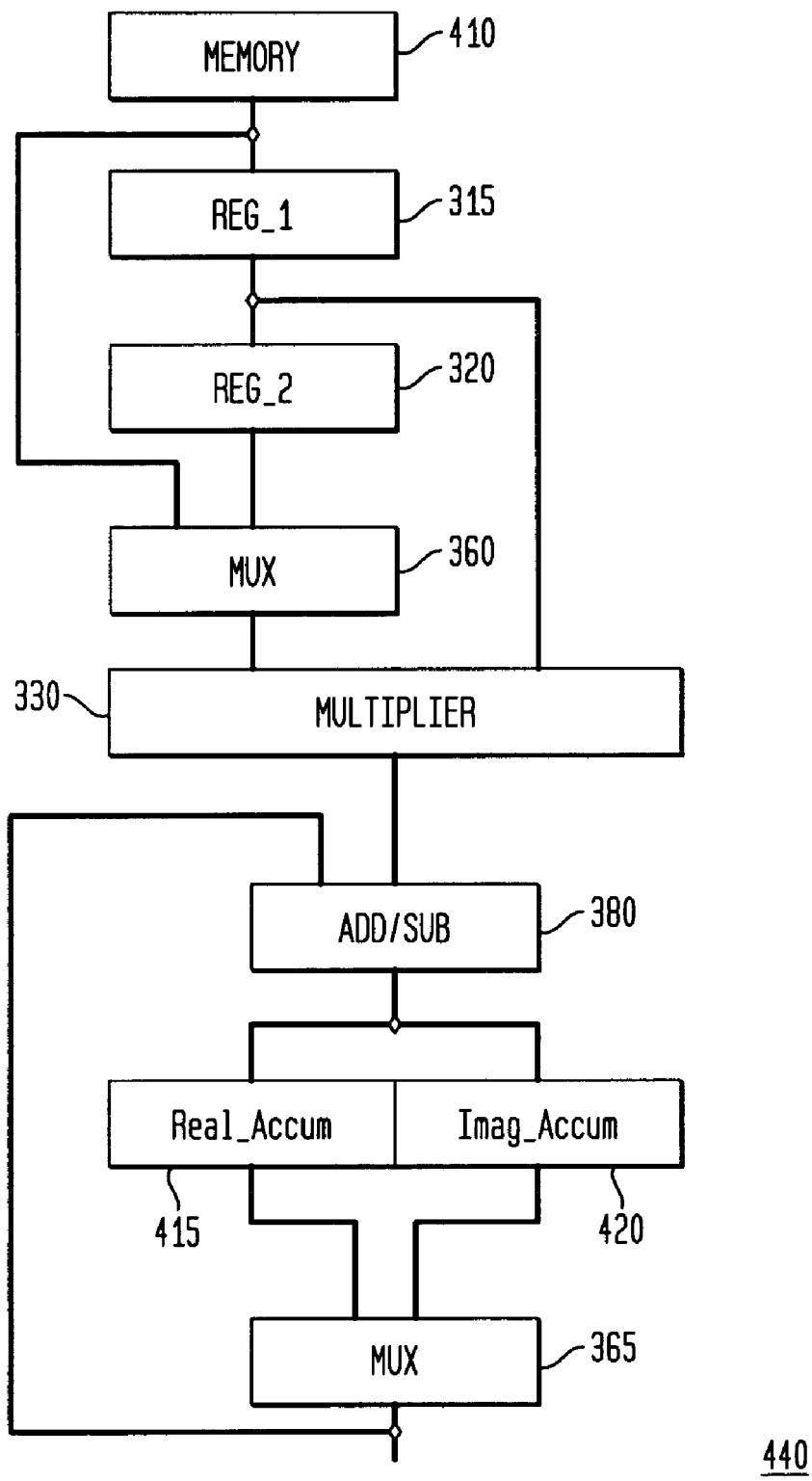

FIG. 5D is a block diagram illustrating a complex finite impulse response (FIR) filter computational unit 440. As illustrated, this exemplary computational unit 440 includes a fourth configuration of a plurality of fixed computational elements, including memory 410, registers 315 and 320, multiplier 330, adder/subtracter 380, and real and imaginary accumulator registers 415 and 420, also with multiplexers (MUXes) 360 and 365 forming a portion of the interconnection network (210, 220 and 240).

Figure 5E:
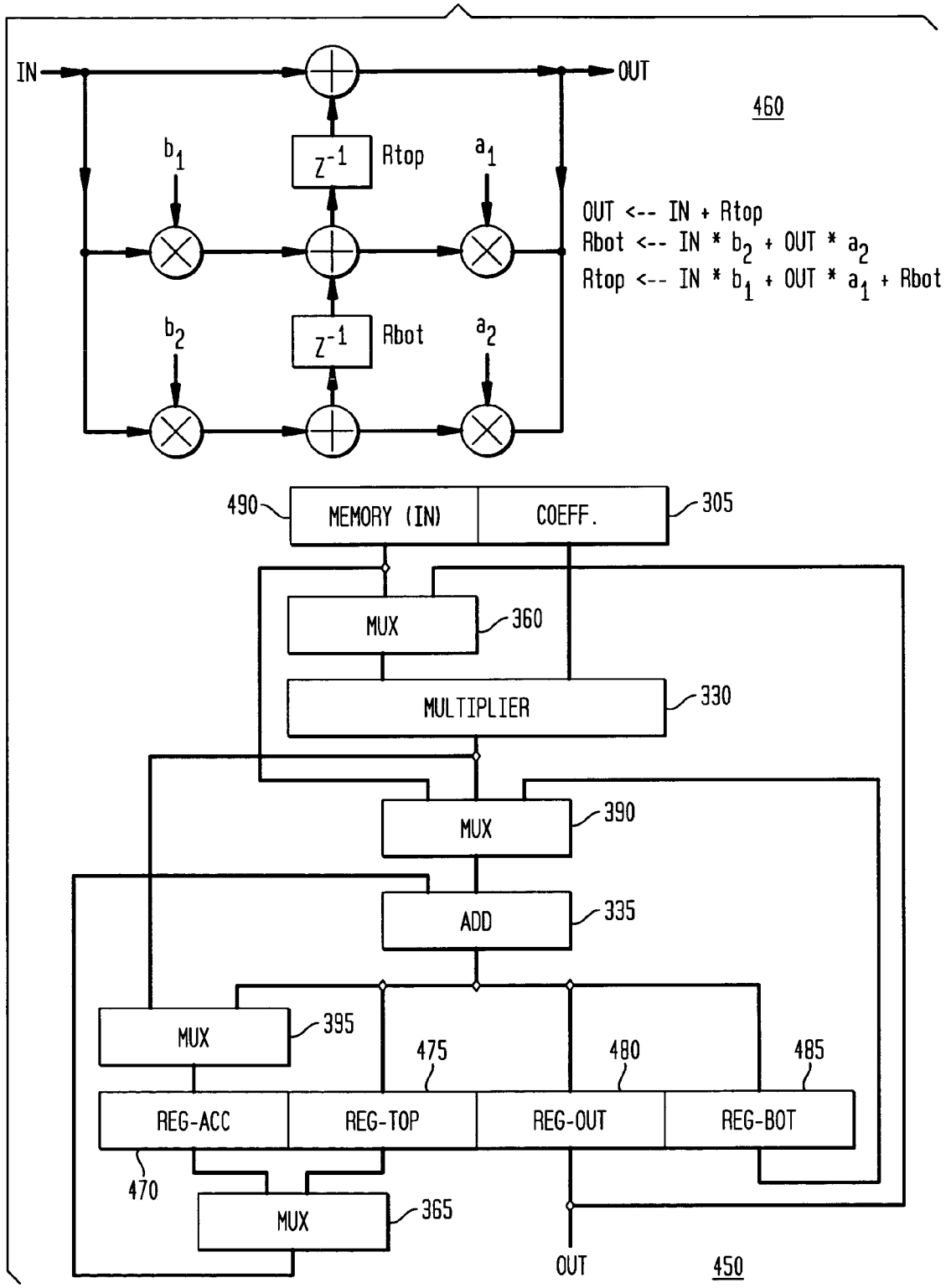

FIG. 5E is a block diagram illustrating a biquad infinite impulse response (IIR) filter computational unit 450, with a corresponding data flow graph 460. As illustrated, this exemplary computational unit 450 includes a fifth configuration of a plurality of fixed computational elements, including coefficient memory 305, input memory 490, registers 470, 475, 480 and 485, multiplier 330, and adder 335, with multiplexers (MUXes) 360, 365, 390 and 395 forming a portion of the interconnection network (210, 220 and 240).

Figures 6, 6A:
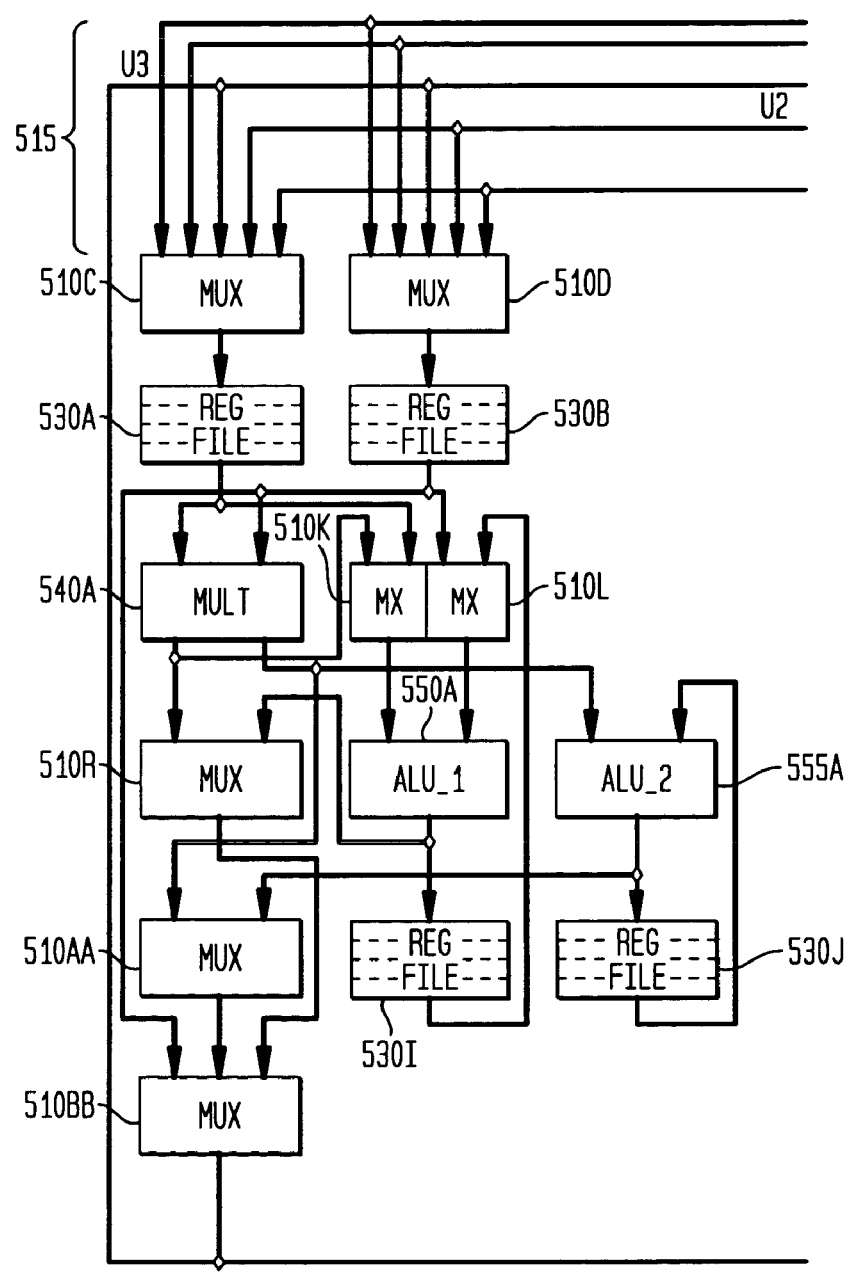
FIG. 6 is a block diagram illustrating, in detail, an exemplary multi-function adaptive computational unit having a plurality of different, fixed computational elements.
Figure 6B:
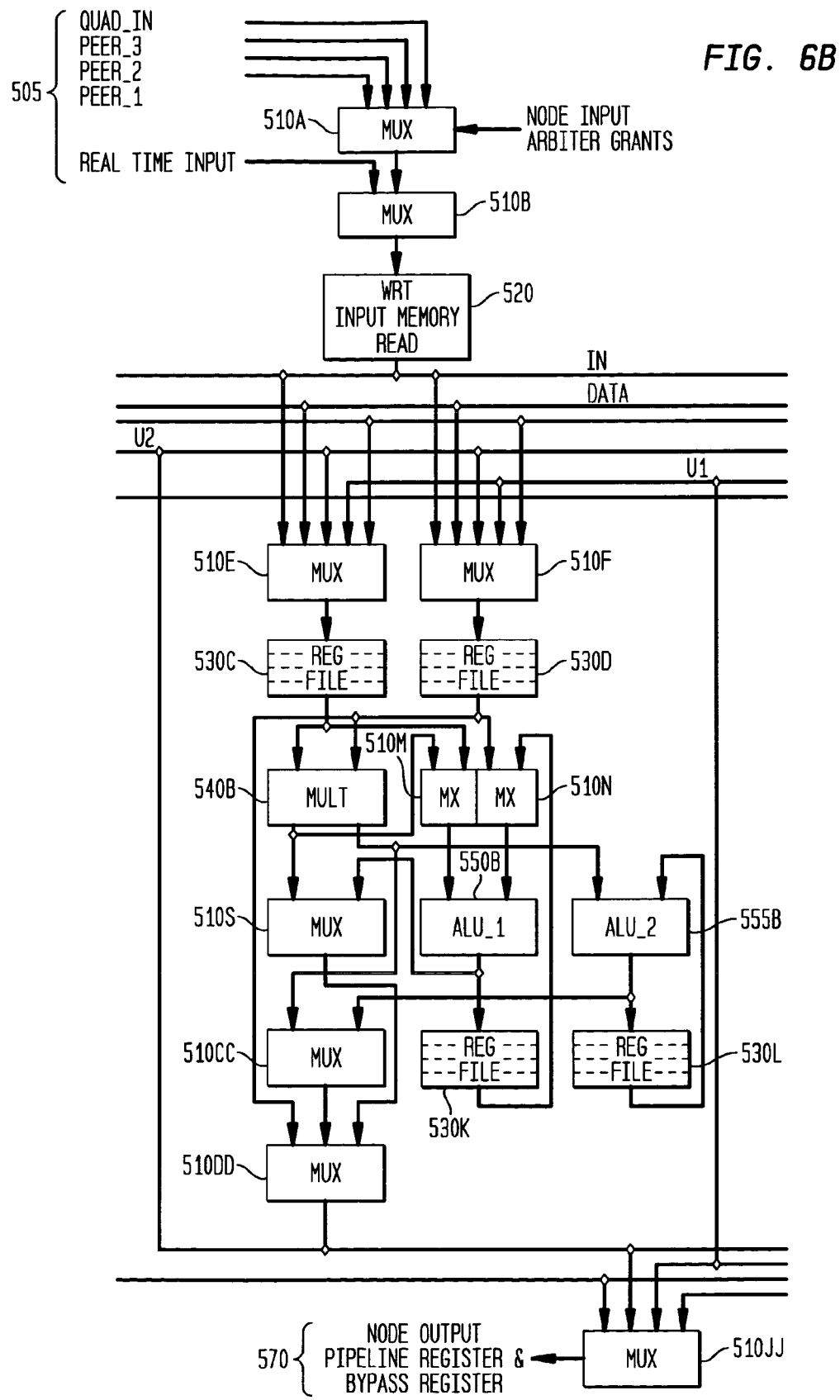
Figure 6C:
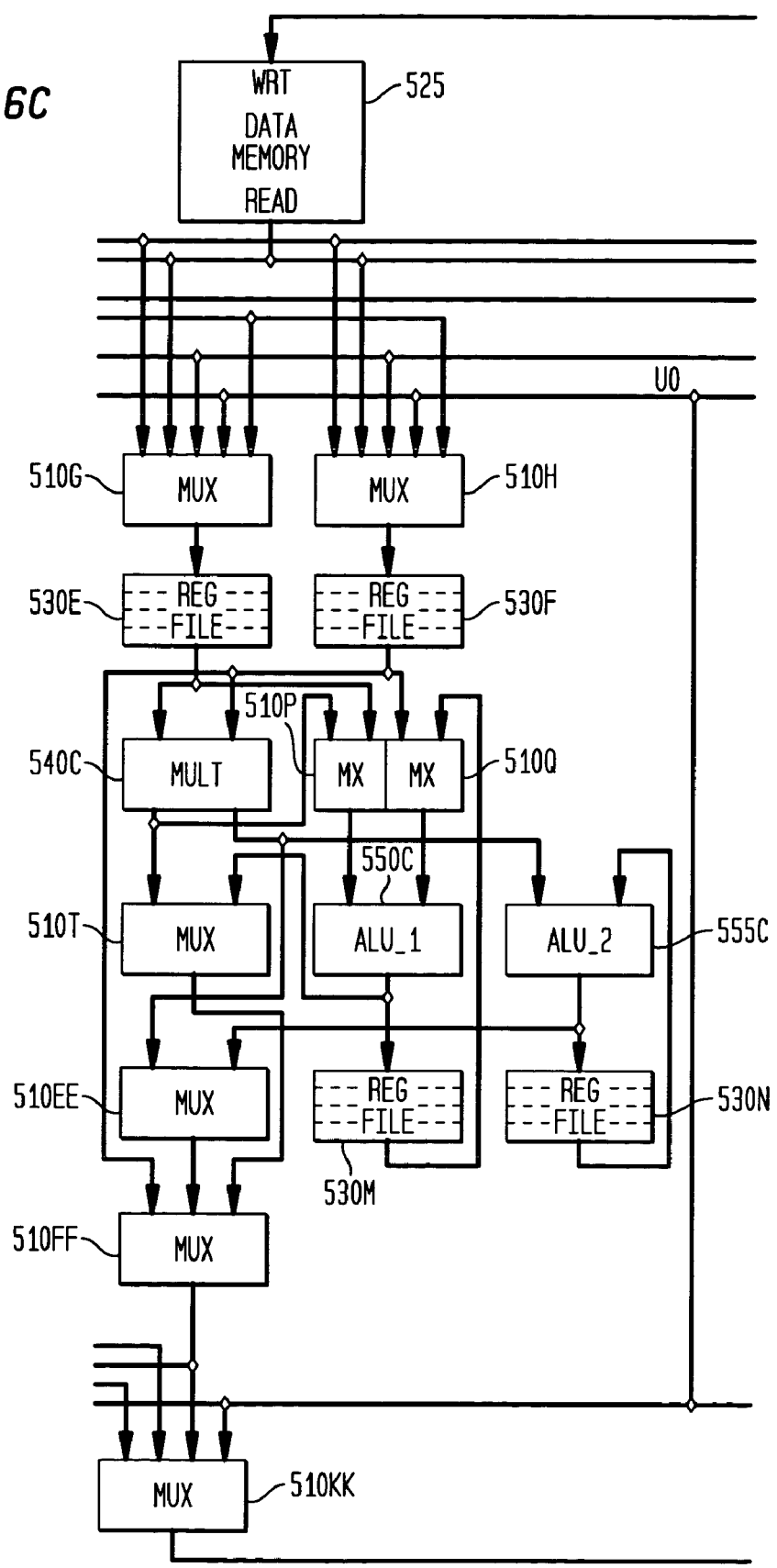
Figure 6D:
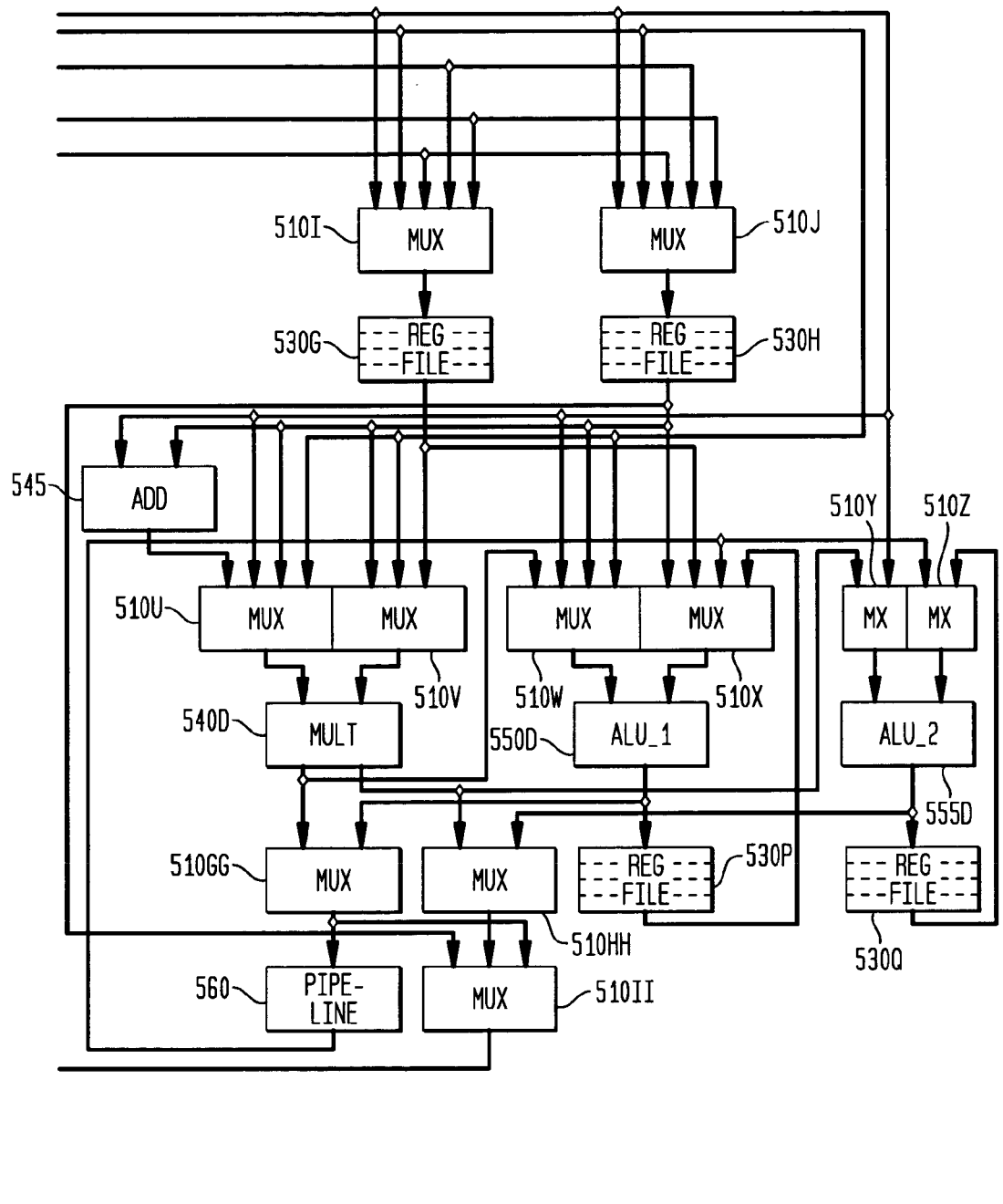

FIG. 6 is a block diagram illustrating, in detail, an exemplary multi-function adaptive computational unit 500 having a plurality of different, fixed computational elements. When configured accordingly, the adaptive computation unit 500 performs each of the various functions previously illustrated with reference to FIGS. 5A though 5E, plus other functions such as discrete cosine transformation. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU__1s 550A through 550D), second arithmetic logic unit (ALU) 555 (illustrated as ALU__2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
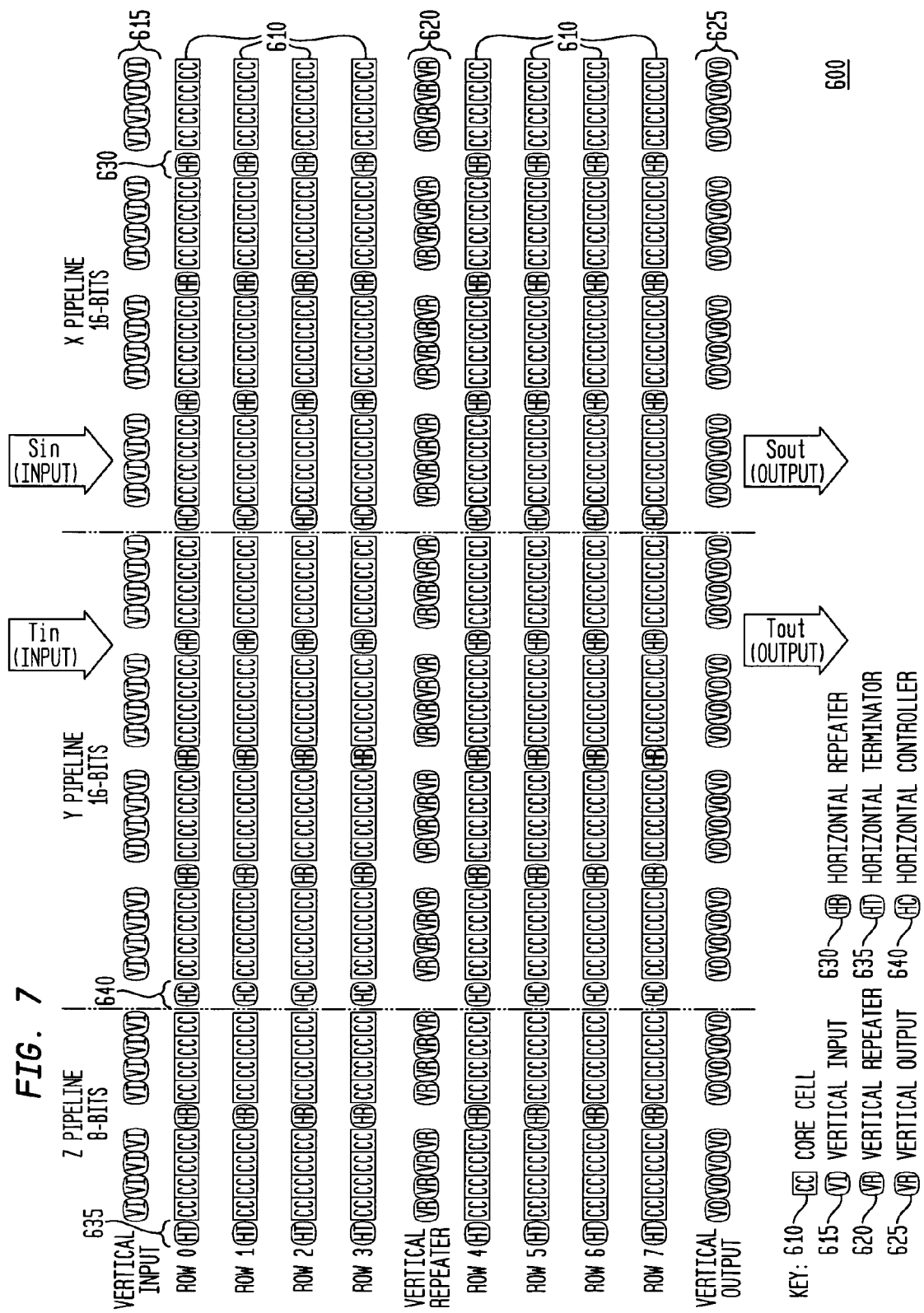
FIG. 7 is a block diagram illustrating, in detail, an adaptive logic processor computational unit having a plurality of fixed computational elements.

FIG. 7 is a block diagram illustrating, in detail, an exemplary adaptive logic processor (ALP) computational unit 600 having a plurality of fixed computational elements. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
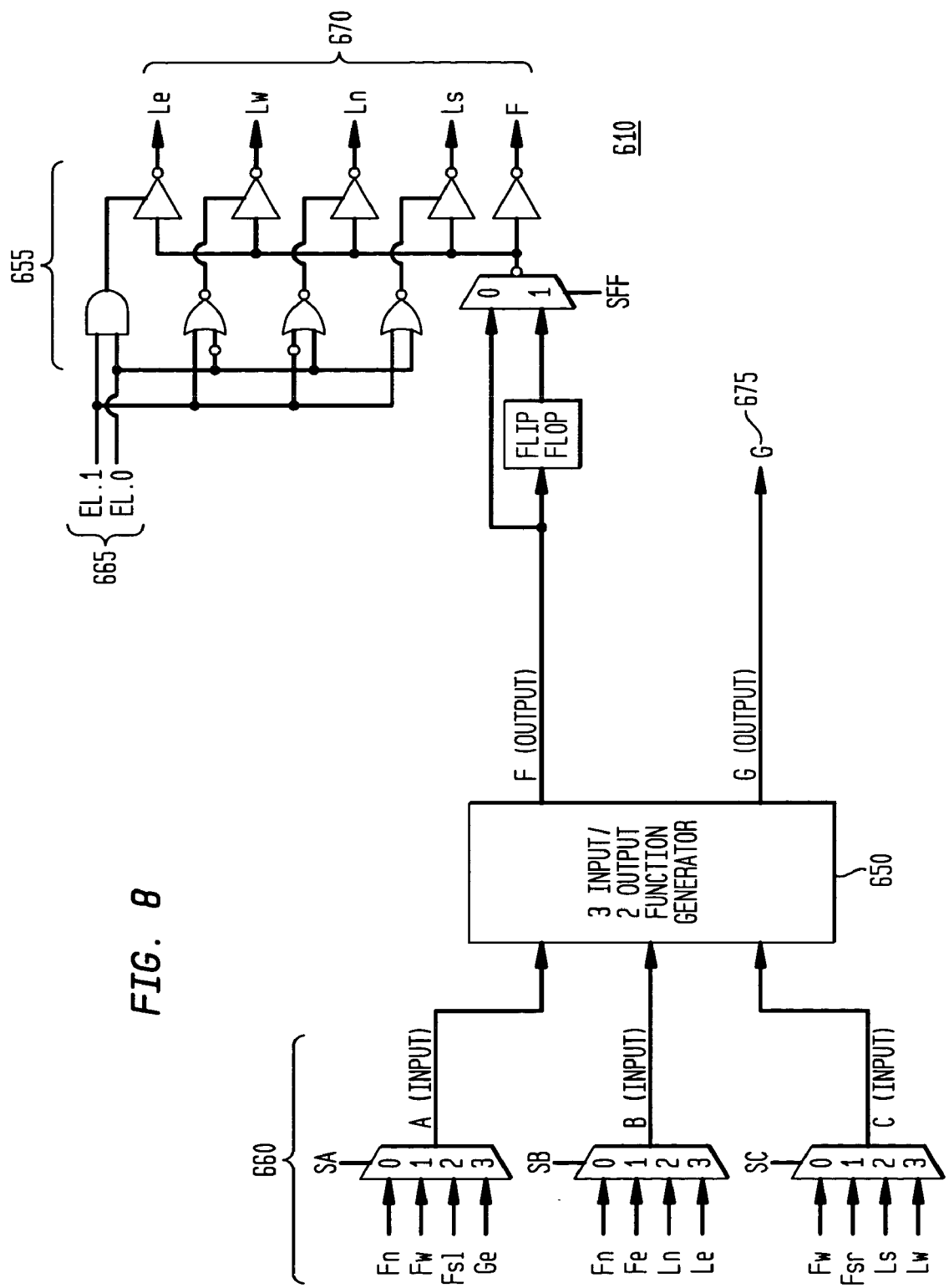
FIG. 8 is a block diagram illustrating, in greater detail, an exemplary core cell of an adaptive logic processor computational unit with a fixed computational element.

FIG. 8 is a block diagram illustrating, in greater detail, an exemplary core cell 610 of an adaptive logic processor computational unit 600 with a fixed computational element 650. The fixed computational element is a 3 input–2 output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
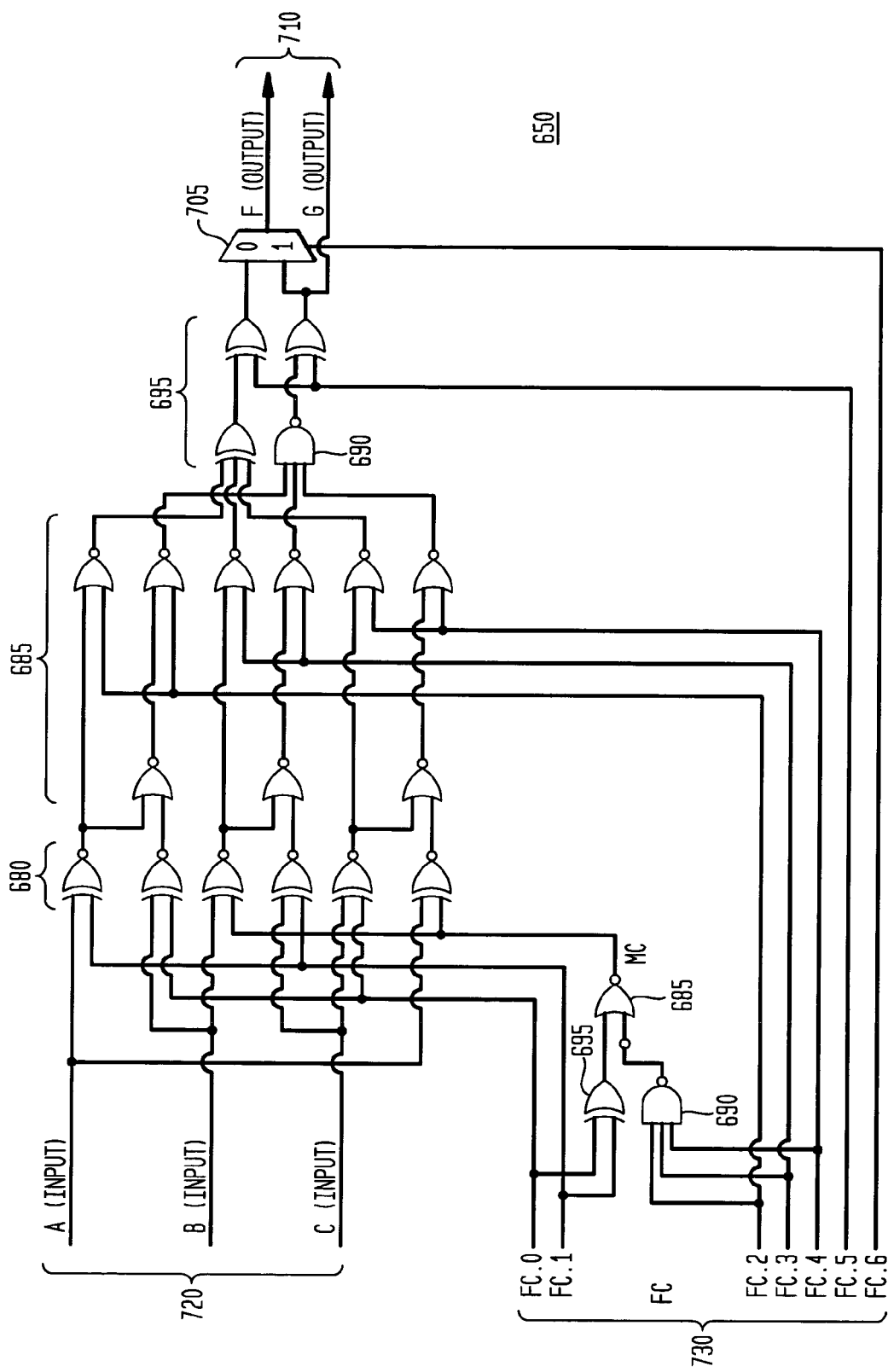
FIG. 9 is a block diagram illustrating, in greater detail, an exemplary fixed computational element of a core cell of an adaptive logic processor computational unit.

FIG. 9 is a block diagram illustrating, in greater detail, an exemplary fixed computational element 650 of a core cell 610 of an adaptive logic processor computational unit 600. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

Figure 10:
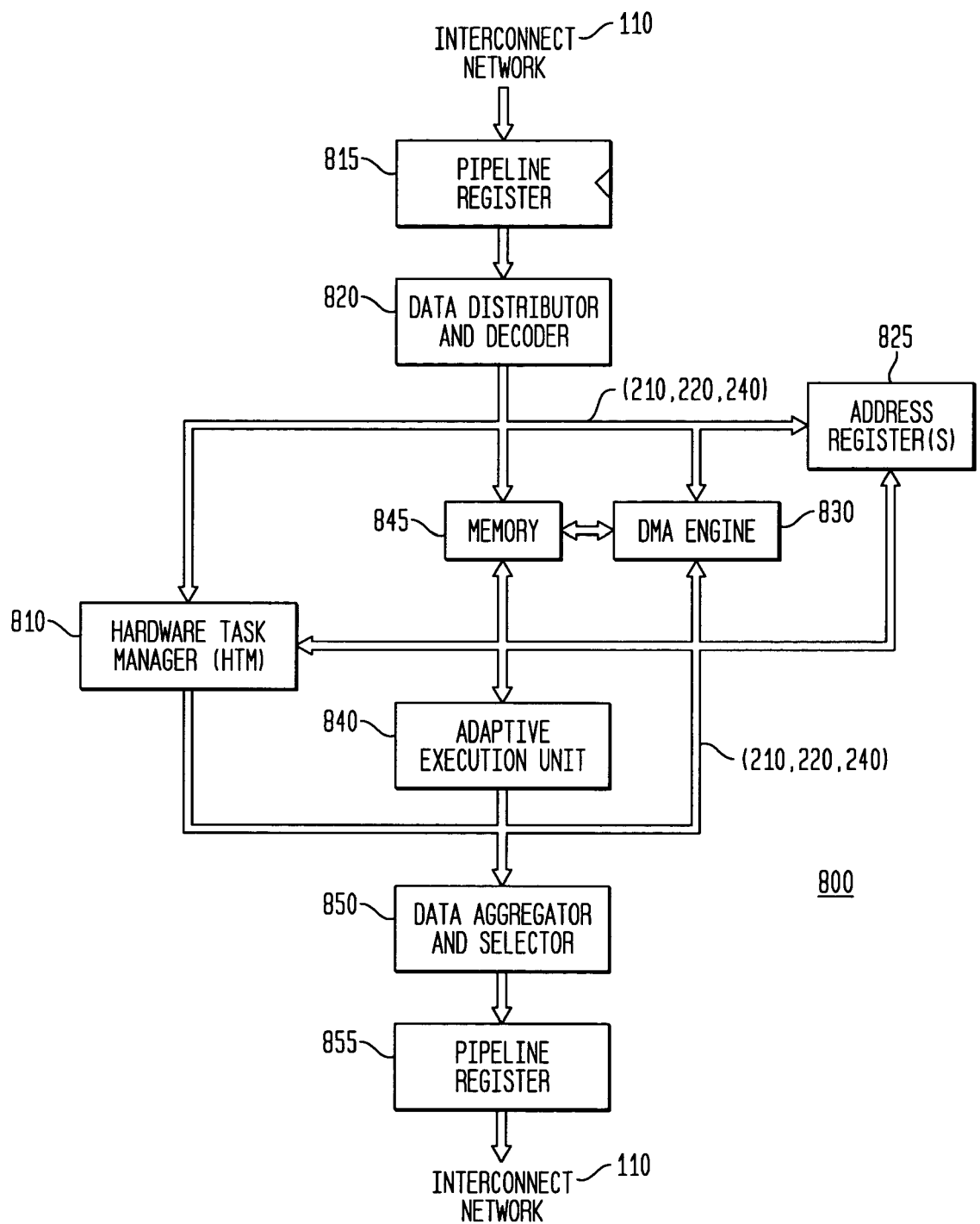
FIG. 10 is a block diagram illustrating a second exemplary apparatus embodiment in accordance with the present invention.

FIG. 10 is a block diagram illustrating a prototypical node or matrix 800 comprising the second apparatus embodiment of the present invention. The node 800 is connected to other nodes 150 within the ACE 100 through the matrix interconnection network 110. The prototypical node 800 includes a fixed (and non-reconfigurable) "node wrapper", an adaptive (reconfigurable) execution unit 840, and a memory 845 (which also may be variable). This fixed and non-reconfigurable "node wrapper" includes an input pipeline register 815, a data decoder and distributor 820, a hardware task manager 810, an address register 825 (optional), a DMA engine 830 (optional), a data aggregator and selector 850, and an output pipeline register 855. These components comprising the node wrapper are generally common to all nodes of the ACE 100, and are comprised of fixed architectures (i.e., application-specific or non-reconfigurable architectures). As a consequence, the node or matrix 800 is a unique blend of fixed, non-reconfigurable node wrapper components, memory, and the reconfigurable components of an adaptive execution unit 840 (which, in turn, are comprised of fixed computational elements and an interconnection network).

Various nodes 800, in general, will have a distinctive and variably-sized adaptive execution unit 840, tailored for one or more particular applications or algorithms, and a memory 845, also implemented in various sizes depending upon the requirements of the adaptive execution unit 840. An adaptive execution unit 840 for a given node 800 will generally be different than the adaptive execution units 840 of the other nodes 800. Each adaptive execution unit 840 is reconfigurable in response to configuration information, and is comprised of a plurality of computation units 200, which are in turn further comprised of a plurality of computational elements 250, and corresponding interconnect networks 210, 220 and 240. Particular adaptive execution units 840 utilized in exemplary embodiments, and the operation of the node 800 and node wrapper, are discussed in greater detail below.

Figure 11:
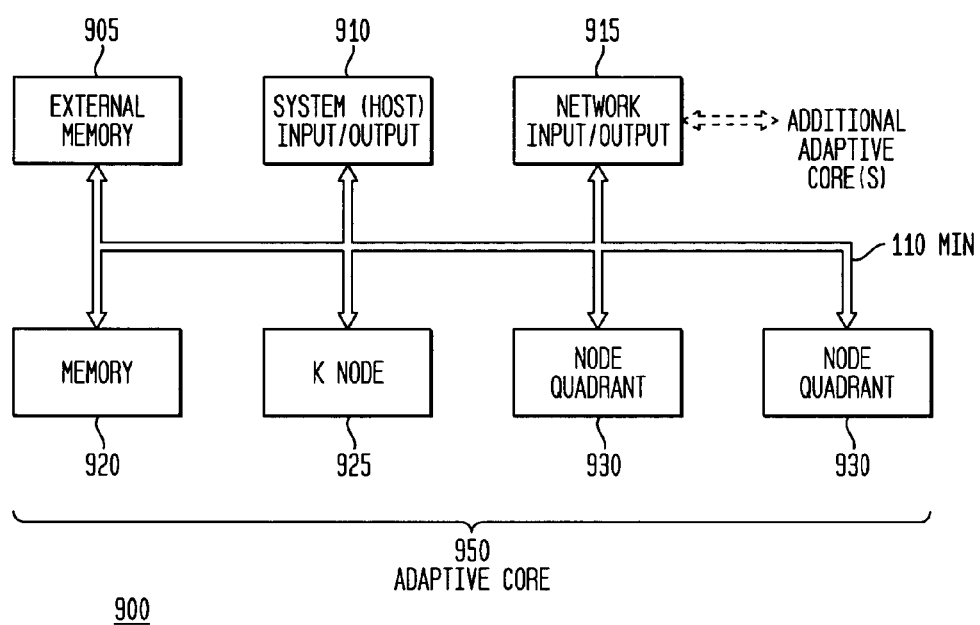
FIG. 11 is a block diagram illustrating an exemplary first system embodiment in accordance with the present invention.

FIG. 11 is a block diagram illustrating a first system embodiment 900 in accordance with the present invention. This first system 900 may be included as part of a larger system or host environment, such as within a computer or communications device, for example. FIG. 11 illustrates a "root" level of such a system 100, where global resources have connectivity (or otherwise may be found). At this root level, the first system 900 includes one or more adaptive cores 950, external (off-IC or off-chip) memory 905 (such as SDRAM), host (system) input and output connections, and network (MIN 110) input and output connections (for additional adaptive cores 950). Each adaptive core 950 includes (on-IC or on-chip) memory 920, a "K-node" 925, and one or more sets of nodes (150, 800) referred to as a node quadrant 930. The K-node 925 (like the kernel controller 150A) provides an operating system function for the adaptive core 950.

Generally, each node quadrant 930 consists of 16 nodes in a scalable by-four (×4) fractal arrangement. At this root level, each of these (seven) illustrated elements has total connectivity with all other (six) elements. As a consequence, the output of a root-level element is provided to (and may drive) all other root-level inputs, and the input of each root-level input is provided with the outputs of all other root-level elements. Not separately illustrated, at this root-level of the first system 900, the MIN 110 includes a network with routing (or switching) elements (935), such as round-robin, token ring, cross point switches, or other arbiter elements, and a network (or path) for real time data transfer (or transmission) (such as a data network 240).

Figure 12:
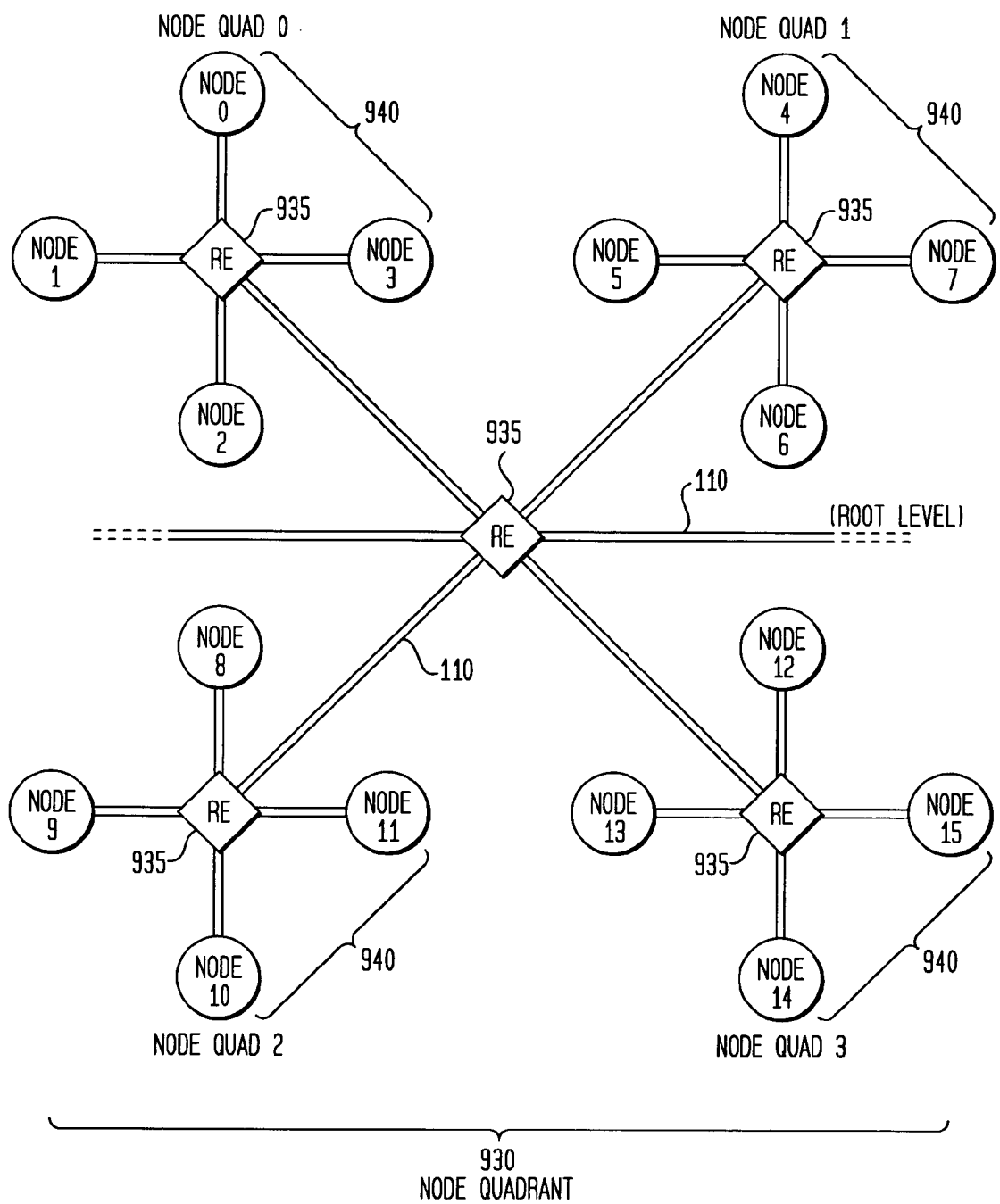
FIG. 12 is a block diagram illustrating an exemplary node quadrant with routing elements.

FIG. 12 is a block diagram illustrating an exemplary node quadrant 930 with routing elements 935. From the root-level, the node quadrant 930 has a tree topology and consists of 16 nodes (150 or 800), with every four nodes connected as a node "quad" 940 having a routing (or switching) element 935. The routing elements may be implemented variously, such as through round-robin, token ring, cross point switches, (four-way) switching, (1/4, 1/3 or 1/2) arbitration or other arbiter or arbitration elements, or depending upon the degree of control overhead which may be tolerable, through other routing or switching elements such as multiplexers and demultiplexers. This by-four fractal architecture provides for routing capability, scalability, and expansion, without logical limitation. The node quadrant 930 is coupled within the first system 900 at the root-level, as illustrated. This by-four fractal architecture also provides for significant and complete connectivity, with the worst-case distance between any node being $\log_4$ of "k" hops (or number of nodes) (rather than a linear distance), and provides for avoiding the overhead and capacitance of, for example, busses or full crossbar switches.

The node quadrant 930 and node quad 940 structures exhibit a fractal self-similarity with regard to scalability, repeating structures, and expansion. The node quadrant 930 and node quad 940 structures also exhibit a fractal self-similarity with regard to a heterogeneity of the plurality of heterogeneous and reconfigurable nodes 800, heterogeneity of the plurality of heterogeneous computation units 200, and heterogeneity of the plurality of heterogeneous computational elements 250. With regard to the increasing heterogeneity, the adaptive computing integrated circuit 900 exhibits increasing heterogeneity from a first level of the plurality of heterogeneous and reconfigurable matrices, to a second level of the plurality of heterogeneous computation units, and further to a third level of the plurality of heterogeneous computational elements. The plurality of interconnection levels also exhibits a fractal self-similarity with regard to each interconnection level of the plurality of interconnection levels. At increasing depths within the ACE 100, from the matrix 150 level to the computation unit 200 level and further to the computational element 250 level, the interconnection network is increasingly rich, providing an increasing amount of bandwidth and an increasing number of connections or connectability for a correspondingly increased level of reconfigurability. As a consequence, the matrix-level interconnection network, the computation unit-level interconnection network, and the computational element-level interconnection network also constitute a fractal arrangement.

Referring to FIGS. 11 and 12, and as explained in greater detail below, the system embodiment 900 utilizes point-to-point service for streaming data and configuration information transfer, using a data packet (or data structure) discussed below. A packet-switched protocol is utilized for this communication, and in an exemplary embodiment the packet length is limited to a length of 51 bits, with a one word (32 bits) data payload, to obviate any need for data buffering. The routing information within the data packet provides for selecting the particular adaptive core 950, followed by selecting root-level (or not) of the selected adaptive core 950, followed by selecting a particular node (110 or 800) of the selected adaptive core 950. This selection path may be visualized by following the illustrated connections of FIGS. 11 and 12. Routing of data packets out of a particular node may be performed similarly, or may be provided more directly, such as by switching or arbitrating within a node 800 or quad 940, as discussed below.

Figure 13:
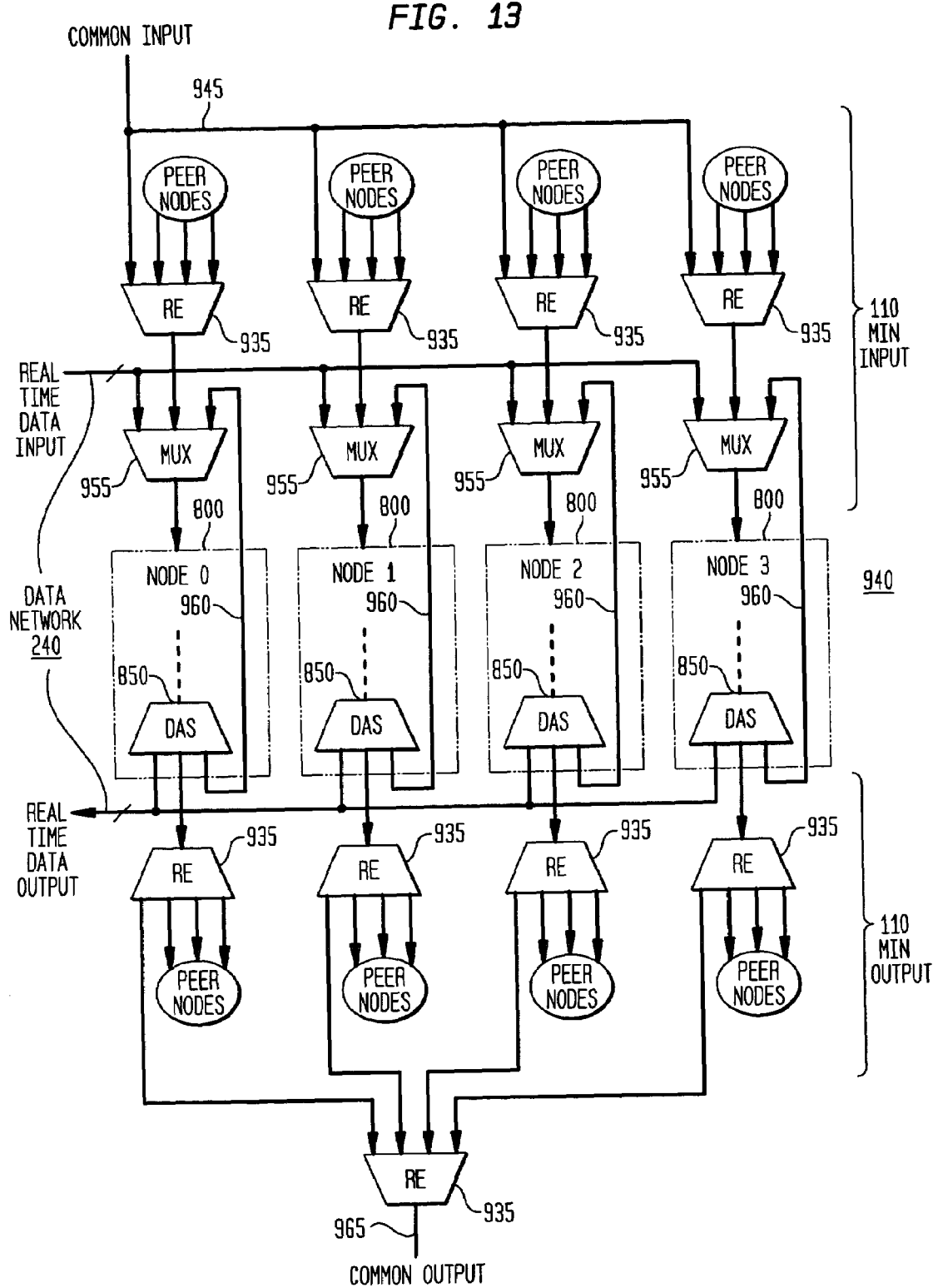
FIG. 13 is a block diagram illustrating exemplary network interconnections.

FIG. 13 is a block diagram illustrating exemplary network interconnections into and out of nodes 800 and node quads 940. Referring to FIG. 13, MIN 100 connections into a node, via a routing element 935, include a common input 945 (provided to all four nodes 800 within a quad 940), and inputs from the other (three) "peer" nodes within the particular quad 940. For example, outputs from peer nodes 1, 2 and 3 are utilized for input into node 0, and so on. At this level, the routing element 935 may be implemented, for example, as a round-robin, token ring, arbiter, cross point switch, or other four-way switching element. The output from the routing element 935 is provided to a multiplexer 955 (or other switching element) for the corresponding node 800, along with a feedback input 960 from the corresponding node 800, and an input for real time data (from data network 240) (to provide a fast track for input of real time data into nodes 800). The multiplexer 955 (or other switching element) provides selection (switching or arbitration) of one of 3 inputs, namely, selection of input from the selected peer or common 945, selection of input from the same node as feedback, or selection of input of real time data, with the output of the multiplexer 955 provided as the network (MIN 110) input into the corresponding node 800 (via the node's pipeline register 815).

The node 800 output is provided to the data aggregator and selector ("DAS") 850 within the node 800, which determines the routing of output information to the node itself (same node feedback), to the network (MIN 110) (for routing to another node or other system element), or to the data network 240 (for real time data output). When the output information is selected for routing to the MIN 110, the output from the DAS 850 is provided to the corresponding output routing element 935, which routes the output information to peer nodes within the quad 940 or to another, subsequent routing element 935 for routing out of the particular quad 940 through a common output 965 (such for routing to another node quad 940, node quadrant 930, or adaptive core 950).

Figure 14:
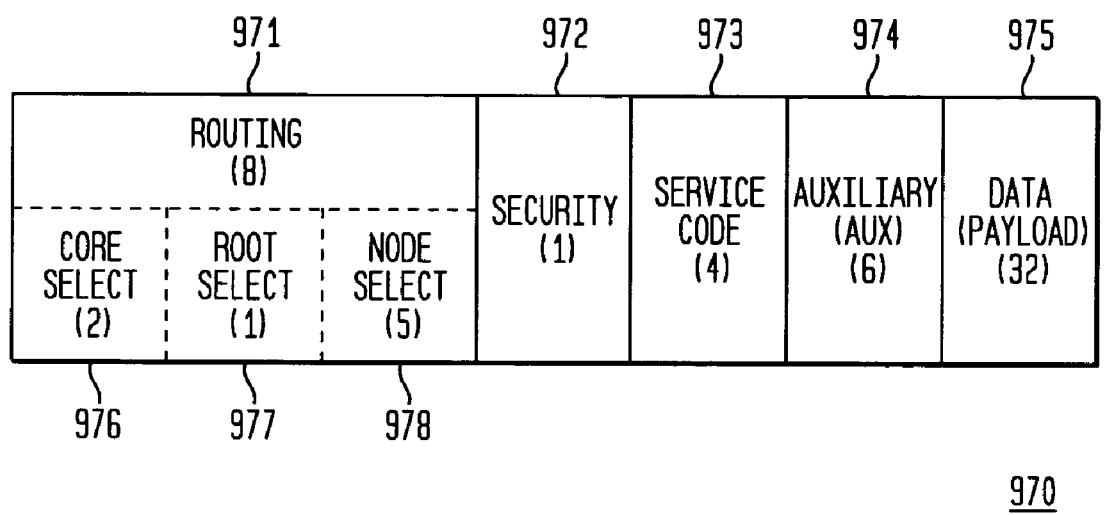
FIG. 14 is a block diagram illustrating an exemplary data structure embodiment.

FIG. 14 is a block diagram illustrating an exemplary data structure embodiment. The system embodiment 900 utilizes point-to-point data and configuration information transfer, using a data packet (as an exemplary data structure) 970, and may be considered as an exemplary form of "silverware", as previously described herein. The exemplary data packet 970 provides for 51 bits per packet, with 8 bits provided for a routing field (971), 1 bit for a security field (972), 4 bits for a service code field (973), 6 bits for an auxiliary field (974), and 32 bits (one word length) for data (as a data payload or data field) (975). As indicated above, the routing field 971 may be further divided into fields for adaptive core selection (976), root selection (977), and node selection (978). In this selected 51-bit embodiment, up to four adaptive cores may be selected, and up to 32 nodes per adaptive core. As the packet is being routed, the routing bits may be stripped from the packet as they are being used in the routing process. The service code field 973 provides for designations such as point-to-point inter-process communication, acknowledgements for data flow control, "peeks" and "pokes" (as coined terminology referring to reads and writes by the K-node into memory 845), DMA operations (for memory moves), and random addressing for reads and writes to memory 845. The auxiliary (AUX) field 974 supports up to 32 streams for any of up to 32 tasks for execution on the adaptive execution unit 840, as discussed below, and may be considered to be a configuration information payload. The one word length (32-bit) data payload is then provided in the data field 975. The exemplary data structure 970 (as a data packet) illustrates the interdigitation of data and configuration/control information, as discussed above.

Referring to FIG. 10, in light of the first system 900 structure and data structure discussed above, the node 800 architecture of the second apparatus embodiment may be described in more detail. The input pipeline register 815 is utilized to receive data and configuration information from the network interconnect 110. Preferably, the input pipeline register 815 does not permit any data stalls. More particularly, in accordance with the data flow modeling, the input pipeline register 815 should accept new data from the interconnection network 110 every clock period; consequently, the data should also be consumed as it is produced. This imposes the requirement that any contention issues among the input pipeline register 815 and other resources within the node 800 be resolved in favor of the input pipeline register 815, i.e., input data in the input pipeline register has priority in the selection process implemented in various routing (or switching) elements 935, multiplexers 955, or other switching or arbitration elements which may be utilized.

The data decoder and distributor 820 interfaces the input pipeline register 815 to the various memories (e.g., 845) and registers (e.g., 825) within the node 800, the hardware task manager 810, and the DMA engine 830, based upon the values in the service and auxiliary fields of the 51-bit data structure. The data decoder 820 also decodes security, service, and auxiliary fields of the 51-bit network data structure (of the configuration information or of operand data) to direct the received word to its intended destination within the node 800.

Conversely, data from the node 800 to the network (MIN 110 or to other nodes) is transferred via the output pipeline register 855, which holds data from one of the various memories (845) or registers (e.g., 825 or registers within the adaptive execution unit 840) of the node 800, the adaptive execution unit 840, the DMA engine 830, and/or the hardware task manager 810. Permission to load data into the output pipeline register 855 is granted by the data aggregator and selector (DAS) 850, which arbitrates or selects between and among any competing demands of the various (four) components of the node 800 (namely, requests from the hardware task manager 810, the adaptive execution unit 840, the memory 845, and the DMA engine 830). The data aggregator and selector 850 will issue one and only one grant whenever there is one or more requests and the output pipeline register 855 is available. In the selected embodiment, the priority for issuance of such a grant is, first, for K-node peek (read) data; second, for the adaptive execution unit 840 output data; third, for source DMA data; and fourth, for hardware task manager 810 message data. The output pipeline register 855 is available when it is empty or when its contents will be transferred to another register at the end of the current clock cycle.

The DMA engine 830 of the node 800 is an optional component. In general, the DMA engine 830 will follow a five register model, providing a starting address register, an address stride register, a transfer count register, a duty cycle register, and a control register. The control register within the DMA engine 830 utilizes a GO bit, a target node number and/or port number, and a DONE protocol. The K-node 925 writes the registers, sets the GO bit, and receives a DONE message when the data transfer is complete. The DMA engine 830 facilitates block moves from any of the memories of the node 800 to another memory, such as an on-chip bulk memory, external SDRAM memory, another node's memory, or a K-node memory for diagnostics and/or operational purposes. The DMA engine 830, in general, is controlled by the K-node 925.

The hardware task manager 810 is configured and controlled by the K-node 925 and interfaces to all node components except the DMA engine 830. The hardware task manager 810 executes on each node 800, processing a task list and producing a task ready-to-run queue implemented as a first in-first out (FIFO) memory. The hardware task manager 810 has a top level finite state machine that interfaces with a number of subordinate finite state machines that control the individual hardware task manager components. The hardware task manager 810 controls the configuration and reconfiguration of the computational elements 250 within the adaptive execution unit 840 for the execution of any given task by the adaptive execution unit 840.

The K-node 925 initializes the hardware task manager 810 and provides it with set up information for the tasks needed for a given operating mode, such as operating as a communication processor or an MP3 player. The K-node 925 provides configuration information as stored tasks (i.e., stored tasks or programs) within memory 845 and within local memory within the adaptive execution unit 840. The K-node 925 initializes the hardware task manager 810 (as a parameter table) with designations of input ports, output ports, routing information, the type of operations (tasks) to be executed (e.g., FFT, DCT), and memory pointers. The K-node 925 also initializes the DMA engine 830.

The hardware task manager 810 maintains a port translation table and generates addresses for point-to-point data delivery, mapping input port numbers to a current address of where incoming data should be stored in memory 845. The hardware task manager 810 provides data flow control services, tracking both production and consumption of data, using corresponding production and consumption counters, and thereby determines whether a data buffer is available for a given task. The hardware task manager 810 maintains a state table for tasks and, in the selected embodiment, for up to 32 tasks. The state table includes a GO bit (which is enabled or not enabled (suspended) by the K-node 925), a state bit for the task (idle, ready-to-run, run (running)), an input port count, and an output port count (for tracking input data and output data). In the selected embodiment, up to 32 tasks may be enabled at a given time. For a given enabled task, if its state is idle, and if sufficient input data (at the input ports) are available and sufficient output ports are available for output data, its state is changed to ready-to-run and queued for running (transferred into a ready-to-run FIFO or queue). Typically, the adaptive execution unit 840 is provided with configuration information (or code) and two data operands (x and y).

From the ready-to-run queue, the task is transferred to an active task queue, the adaptive execution unit 840 is configured for the task (set up), the task is executed by the adaptive execution unit 840, and output data is provided to the data aggregator and selector 850. Following this execution, the adaptive execution unit 840 provides an acknowledgement message to the hardware task manager 810, requesting the next item. The hardware task manager 810 may then direct the adaptive execution unit 840 to continue to process data with the same configuration in place, or to tear down the current configuration, acknowledge completion of the tear down and request the next task from the ready-to-run queue. Once configured for execution of a selected algorithm, new configuration information is not needed from the hardware task manager 810, and the adaptive execution unit 840 functions effectively like an ASIC, with the limited additional overhead of acknowledgement messaging to the hardware task manager 810. These operations are described in additional detail below.

A module is a self-contained block of code (for execution by a processor) or a hardware-implemented function (embodied as configured computational elements 250), which is processed or performed by an execution unit 840. A task is an instance of a module, and has four states: suspend, idle, ready or run. A task is created by associating the task to a specific module (computational elements 250) on a specific node 800; by associating physical memories and logical input buffers, logical output buffers, logical input ports and logical output ports of the module; and by initializing configuration parameters for the task. A task is formed by the K-node writing the control registers in the node 800 where the task is being created (i.e., enabling the configuration of computational elements 250 to perform the task), and by the K-node writing to the control registers in other nodes, if any, that will be producing data for the task and/or consuming data from the task. These registers are memory mapped into the K-node's address space, and "peek and poke" network services are used to read and write these values. A newly created task starts in the "suspend" state.

Once a task is configured, the K-node can issue a "go" command, setting a bit in a control register in the hardware task manager 810. The action of this command is to move the task from the "suspend" state to the "idle" state. When the task is "idle" and all its input buffers and output buffers are available, the task is added to the "ready-to-run" queue which is implemented as a FIFO; and the task state is changed to "ready/run". Buffers are available to the task when subsequent task execution will not consume more data than is present in its input buffers or will not produce more data than there is capacity in its output buffers.

When the adaptive execution unit 840 is not busy and the FIFO is not empty, the task number for the next task that is ready to execute is removed from the FIFO, and the state of this task is "run". In the "run" state, the task (executed by the configured adaptive execution unit 840) consumes data from its input buffers and produces data for its output buffers.

The adaptive execution units 840 will vary depending upon the type of node 800 implemented. Various adaptive execution units 840 may be specifically designed and implemented for use in heterogeneous nodes 800, for example, for a programmable RISC processing node; for a programmable DSP node; for an adaptive or reconfigurable node for a particular domain, such as an arithmetic node; and for an adaptive bit-manipulation unit (RBU). Various adaptive execution units 840 are discussed in greater detail below.

For example, a node 800, through its execution unit 840, will perform an entire algorithmic element in a comparatively few clock cycles, such as one or two clock cycles, compared to performing a long sequence of separate operations, loads/stores, memory fetches, and so on, over many hundreds or thousands of clock cycles, to eventually achieve the same end result. Through its computational elements 250, the execution unit 840 may then be reconfigured to perform another, different algorithmic element. These algorithmic elements are selected from a plurality of algorithmic elements comprising, for example: a radix-2 Fast Fourier Transformation (FFT), a radix-4 Fast Fourier Transformation (FFT), a radix-2 Inverse Fast Fourier Transformation (IFFT), a radix-4 Inverse Fast Fourier Transformation (IFFT), a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation.

In an exemplary embodiment, a plurality of different nodes 800 are created, by varying the type and amount of computational elements 250 (forming computational units 200), and varying the type, amount and location of interconnect (with switching or routing elements) which form the execution unit 840 of each such node 800. In the exemplary embodiment, two different nodes 800 perform, generally, arithmetic or mathematical algorithms, and are referred to as adaptive (or reconfigurable) arithmetic nodes (AN), as AN1 and AN2. For example, the AN1 node, as a first node 800 of the plurality of heterogeneous and reconfigurable nodes, comprises a first selection of computational elements 250 from the plurality of heterogeneous computational elements to form a first reconfigurable arithmetic node for performance of Fast Fourier Transformation (FFT) and Discrete Cosine Transformation (DCT). Continuing with the example, the AN2 node, as a second node 800 of the plurality of heterogeneous and reconfigurable nodes, comprises a second selection of computational elements 250 from the plurality of heterogeneous computational elements to form a second reconfigurable arithmetic node, the second selection different than the first selection, for performance of at least two of the following algorithmic elements: multi-dimensional Discrete Cosine Transformation (DCT), finite impulse response (FIR) filtering, OVSF code generation, Haddamard Transformation, bit-wise WCDMA Turbo interleaving, WCDMA uplink concatenation, WCDMA uplink repeating, and WCDMA uplink real spreading and gain scaling.

Also in the exemplary embodiment, a plurality of other types of nodes 800 are defined, such as, for example:

A bit manipulation node, as a third node of the plurality of heterogeneous and reconfigurable nodes, comprising a third selection of computational elements 250 from the plurality of heterogeneous computational elements, the third selection different than the first selection, for performance of at least two of the following algorithmic elements: variable and multiple rate convolutional encoding, scrambling code generation, puncturing, interleaving, modulation mapping, complex multiplication, Viterbi algorithm, Turbo encoding, Turbo decoding, correlation, linear feedback shifting, downlink despreading, uplink spreading, CRC encoding, de-puncturing, and de-repeating.

A reconfigurable filter node, as a fourth node of the plurality of heterogeneous and reconfigurable nodes, comprising a fourth selection of computational elements 250 from the plurality of heterogeneous computational elements, the fourth selection different than the first selection, for performance of at least two of the following algorithmic elements: adaptive finite impulse response (FIR) filtering, Griffith's LMS algorithm, and RRC filtering.

A reconfigurable finite state machine node, as a fifth node of the plurality of heterogeneous and reconfigurable nodes, comprising a fifth selection of computational elements 250 from the plurality of heterogeneous computational elements, the fifth selection different than the first selection, for performance of at least two of the following processes: control processing; routing data and control information between and among the plurality of heterogeneous computational elements 250; directing and scheduling the configuration of the plurality of heterogeneous computational elements for performance of a first algorithmic element and the reconfiguration of the plurality of heterogeneous computational elements for performance of a second algorithmic element; timing and scheduling the configuration and reconfiguration of the plurality of heterogeneous computational elements with corresponding data; controlling power distribution to the plurality of heterogeneous computational elements and the interconnection network; and selecting the first configuration information and the second configuration information from a singular bit stream comprising data commingled with a plurality of configuration information.

A reconfigurable multimedia node, as a sixth node of the plurality of heterogeneous and reconfigurable nodes, comprising a sixth selection of computational elements 250 from the plurality of heterogeneous computational elements, the sixth selection different than the first selection, for performance of at least two of the following algorithmic elements: radix-4 Fast Fourier Transformation (FFT); multi-dimensional radix-2 Discrete Cosine Transformation (DCT); Golay correlation; adaptive finite impulse response (FIR) filtering; Griffith's LMS algorithm; and RRC filtering.

A reconfigurable hybrid node, as a seventh node of the plurality of heterogeneous and reconfigurable nodes, comprising a seventh selection of computational elements 250 from the plurality of heterogeneous computational elements, the seventh selection different than the first selection, for performance of arithmetic functions and bit manipulation functions.

A reconfigurable input and output (I/O) node, as an eighth node of the plurality of heterogeneous and reconfigurable nodes, comprising an eighth selection of computational elements 250 from the plurality of heterogeneous computational elements, the eighth selection different than the first selection, for adaptation of input and output functionality for a plurality of types of I/O standards, the plurality of types of I/O standards comprising standards for at least two of the following: PCI busses, Universal Serial Bus types one and two (USB1 and USB2), and small computer systems interface (SCSI).

A reconfigurable operating system node, as a ninth node of the plurality of heterogeneous and reconfigurable nodes, comprising a ninth selection of computational elements 250 from the plurality of heterogeneous computational elements, the ninth selection different than the first selection, for storing and executing a selected operating system of a plurality of operating systems.

Figure 15:
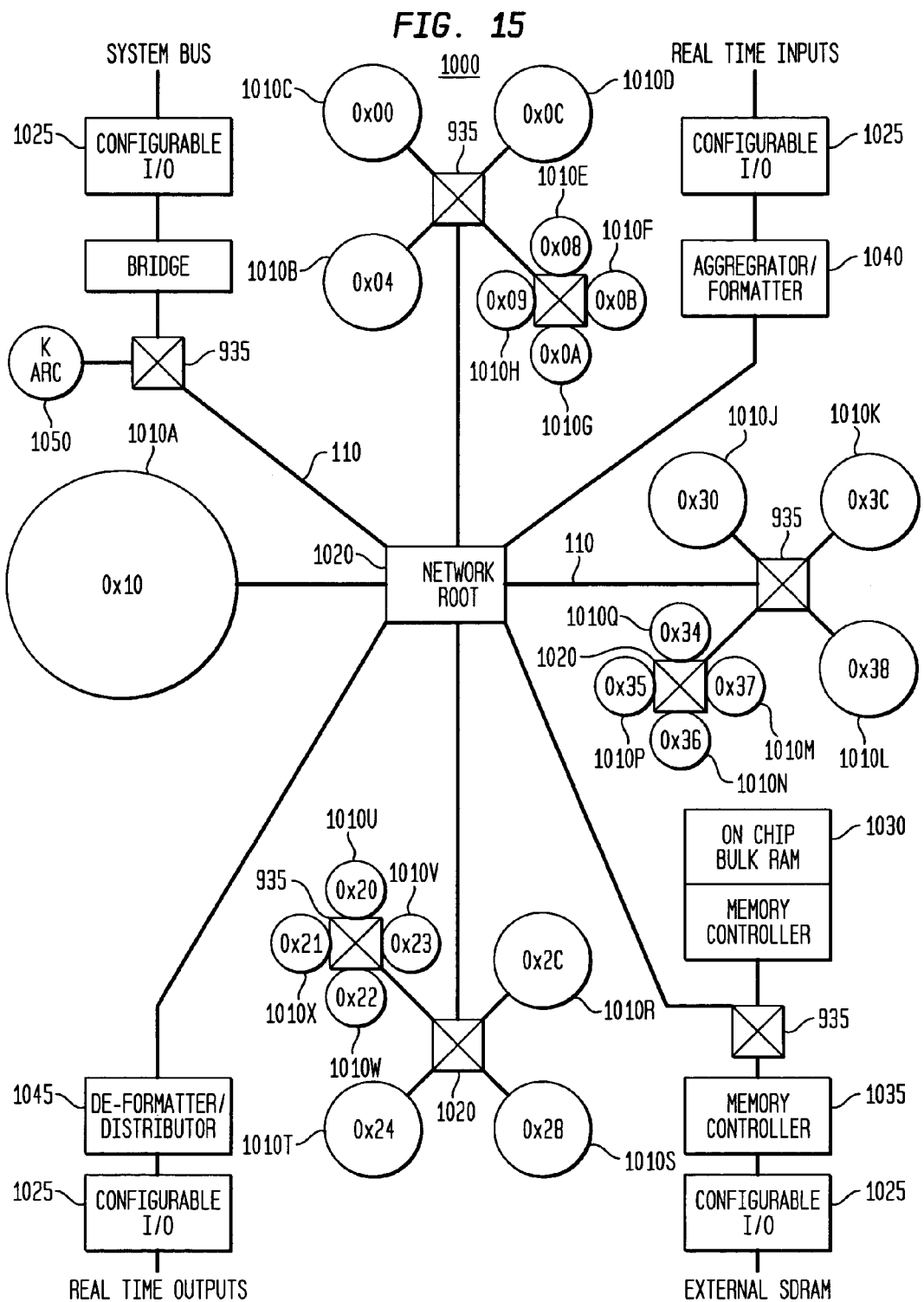
FIG. 15 is a block diagram illustrating an exemplary second system embodiment 1000 in accordance with the present invention.

FIG. 15 is a block diagram illustrating a second system embodiment 1000 in accordance with the present invention. The second system embodiment 1000 is comprised of a plurality of variably-sized nodes (or matrices) 1010 (illustrated as nodes 1010A through 1010X), with the illustrated size of a given node 1010 also indicative of an amount of computational elements 250 within the node 1010 and an amount of memory included within the node 1010 itself. The nodes 1010 are coupled to an interconnect network 110, for configuration, reconfiguration, routing, and so on, as discussed above. The second system embodiment 1000 illustrates node 800 and system configurations which are different and more varied than the quadrant 930 and quad 940 configurations discussed above.

As illustrated, the second system embodiment 1000 is designed for use with other circuits within a larger system and, as a consequence, includes configurable input/output (I/O) circuits 1025, comprised of a plurality of heterogeneous computational elements configurable (through corresponding interconnect, not separately illustrated) for I/O functionality. The configurable input/output (I/O) circuits 1025 provide connectivity to and communication with a system bus (external), external SDRAM, and provide for real time inputs and outputs. A K-node (KARC) 1050 provides the K-node (KARC) functionality discussed above. The second system embodiment 1000 further includes memory 1030 (as on-chip RAM, with a memory controller), and a memory controller 1035 (for use with the external memory (SDRAM)). Also included in the apparatus 1000 are an aggregator/formatter 1040 and a de-formatter/distributor 1045, providing functions corresponding to the functions of the data aggregator and selector 850 and data distributor and decoder 820, respectively, but for the larger system 1000 (rather than within a node 800).

The present invention provides a system and method for implementation and use of a shared memory, such as a First In-First Out ("FIFO") buffer or memory, in the adaptive computing architecture (100, 900) discussed above, and memory or FIFO may be used equivalently and interchangeably with regard to the present invention. In accordance with the present invention, the shared memory may be accessed both independently and asynchronously by one or more processes, allowing data to be streamed to multiple processes without regard to synchronization of the plurality of processes. The present invention also provides for "push back" after a memory read, for applications in which it is desirable to "unread" some elements previously read from the memory 1100, referred to as a memory (or FIFO) read and rewrite process (or push back). Such a memory shared by a plurality of processes may be: a memory 920, shared by a K node 925, a host (through system I/O 910), and/or one or more nodes 800 of a node quadrant 930; may be a memory 845 shared by the processes of an adaptive execution unit 840; or any of the various other memories referred to above (e.g., 140, 1035) or below (1100). In addition, the shared memory may be any form or type of memory discussed above, such as DRAM or SDRAM.

Figure 16:
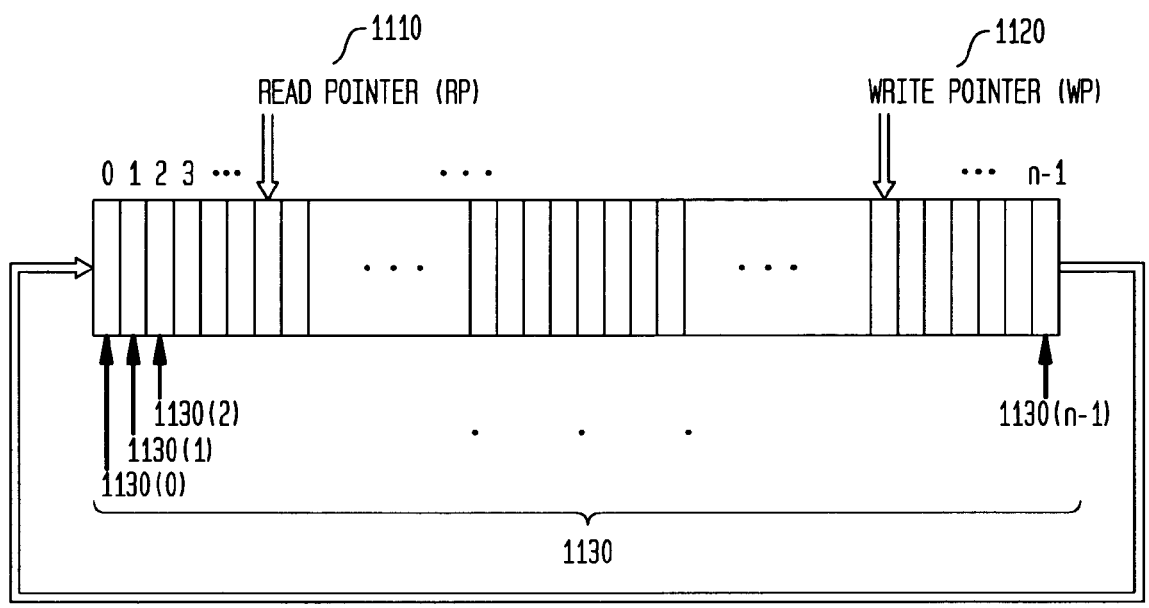
FIG. 16 is a block diagram illustrating an exemplary shared memory in accordance with the present invention.

FIG. 16 is a block diagram illustrating such an exemplary shared memory 1100 in accordance with the present invention. The shared memory (or FIFO) 1100 of the present invention may be implemented, for example, as a C-language array of elements 1130 with an associated structure of control information. An element 1130 is a fundamental component of the memory 1100 and can be of arbitrary (but constant) size specified in bytes, and is generally a form of data stored for use in a wide variety of applications, such as real time voice data for a communication process. When such an element 1130 is stored, that process is referred to herein as a "write" operation, and when the such an element is accessed or removed from memory for use by an application, that process is referred to herein as a "read" operation. Also as used herein, a "source" is an entity or process that writes to the memory (or FIFO) 1100, while a "drain"

is an entity or process that reads from the memory (or FIFO) 1100, and any given application may be a source and/or drain at any instant in time.

An element position is a location in the memory 1100 without regard to whether or not the location is occupied or vacant (has data in it or not). As illustrated, the memory 1100 has a capacity for "n" elements, illustrated as elements 1130(0), 1130(1), 1130(2), through 1130(n−1), using element positions zero (0) through n−1. Conceptually, the memory (or FIFO) 1100 is a circular structure or queue, with the n−1 element position wrapping around to the zero element position, as element positions are continually re-used (re-written with new elements (data)). Physically, the first byte of the first element position (0) is generally at the lowest memory address, while the last byte of the last element position (n−1) is at the highest memory address. As illustrated in FIG. 16, the memory (or FIFO) 1100 has a read pointer (or, equivalently, a read index) 1110 and a write pointer (or, equivalently, a write index) 1120. The write pointer (or index) 1120 indicates the element position to which the next element will be written by the source. A read pointer (or index) 1110 indicates the element position from which the next element will be read by the drain. For purposes of illustration and not limitation, the order of the elements is from left to right, starting at the appropriate (write or read) index, and the circular nature of the memory 1100 is to be considered when the order of elements is determined. Those of skill in the art will recognize that numerous other equivalent memory arrays or structures may be utilized and are within the scope of the present invention.

The shared memory 1100, such as a FIFO, is generally accessed one "buffer" at a time. A buffer is a set of one or more consecutive elements of the shared memory 1100. The buffers used to access the memory 1100 do not have to have the same number of elements (although, for performance, a constant buffer size is usually desired). As the memory 1100 generally is implemented as a circular structure, "wrap-around" occurs when a buffer crosses the physical end of the memory 1100 (at n−1) and the next available element position is at zero.

The present invention (which may be implemented or embodied as software, hardware, or a combination of hardware and software) allows for multiple processes to asynchronously and independently access (write to and/or read from) the shared memory 1100, while memory 1100 integrity is nonetheless maintained. More particularly, the present invention prevents memory 1100 "overrun", memory 1100 "underrun", and memory 1100 "deadlock", when two or more processes are accessing the memory 1100. A memory (or FIFO) overrun is a situation in which a source overwrites elements that have not yet been read by a drain, resulting in a loss of previously stored data which should have been used in an application of the drain. A memory (or FIFO) underrun is a situation in which a drain reads elements that have not yet been written by a source, resulting in processing old, meaningless or "junk" data. A memory (or FIFO) deadlock is a situation in which each of two processes, read and write, cannot proceed until the other one (write and read) proceeds (e.g., there are not sufficient empty element positions for the source to write, and there are not sufficient filled element positions for the drain to read). As indicated above, such memory (or FIFO) integrity is maintained in accordance with the invention without use of a hardware or software "mutual exclusion". In addition, as discussed in greater detail below, the present invention provides for a memory "push back" after read, allowing a process to "unread" data for subsequent use. The invention also provides a mechanism to disambiguate a memory (or FIFO) 1100 full situation from a memory (or FIFO) 1100 empty situation, using a "memory full indicator" (also referred to as a "FIFO full flag").

In accordance with the present invention, memory (or FIFO) 1100 integrity is maintained by ensuring that memory 1100 overrun and memory 1100 underrun cannot occur, even under a condition of asynchronous operations by a source and a drain. Such asynchronousness (or asynchronicity) may be present in the ACE architecture 100 whenever a host, node 800, or K-node share or utilize a FIFO or other memory, as indicated above. In accordance with the present invention, memory (or FIFO) 1100 integrity is ensured through a combination of control (ownership) and proper access order. Such ownership provides that a source (as a write process) or a drain (as a read process) "owns" various indices such as pointers, and are solely allowed to change or modify that index. For example, a source (as a write process) is solely authorized to change or update the write pointer 1120 (and the buffer write count) and set the memory full indicator, such as a FIFO or memory full flag, while a drain (as a read process) is solely authorized to change or update the read pointer 1110 (and the memory read count, below) and clear the memory full indicator (FIFO or memory full flag), as discussed below. In additions, various operations are ordered, such that predetermined sequences of operations are strictly maintained (i.e., departures from the sequencing are not allowed to occur). (It should be noted that when the present invention is embodied as software, certain compiler optimizations that could re-order instructions are to be avoided or prevented, such as through the use of volatile keywords for the read pointer, the write pointer, and the memory full indicator (FIFO full flag).)

More particularly, the following "rules" are utilized in accordance with the present invention: (1) only the source may modify the write pointer (write index) 1120; (2) updating the write pointer or index is the last step (or next to last step) of a write operation; (3) only the drain may modify the read pointer (read index) 1110; (4) updating the read pointer or index 1110 is the last step (or next to last step) of a read operation; (5) to determine an available write count, the source uses the number of previously read (or vacant) element positions; (6) to determine an available read count, the drain uses the number of occupied (previously unread) element positions; (7) only the source may "set" the memory full indicator (FIFO full flag) to indicate that the memory 1100 is or might be full (all element positions 1130 are or may be occupied with data elements); and (8) only the drain may "clear" the memory full indicator (FIFO full flag) to indicate that the memory 1100 is no longer full (some vacant element positions 1130 are available to be filled with data elements). In addition, with regard to sequencing, the following rules are also utilized: (1) at the commencement of a write operation, the source obtains a (first) copy of the memory full indicator and a copy of the read pointer; and (2) at the commencement of a read operation, the drain obtains a (second) copy of the memory full indicator and a copy of the write pointer. As a result of these rules, the source will never "see" more than the correct number of vacant element positions, which prevents memory (or FIFO) 1100 overrun. In addition, the drain will never see more than the correct number of occupied element positions, which prevents memory (or FIFO) 1100 underrun.

To differentiate a memory (or FIFO) 1100 full state from a memory (or FIFO) 1100 empty state, a memory full indicator (also referred to as a "FIFO full flag") is utilized in accordance with the present invention. This use of a memory full indicator (FIFO full flag) eliminates any requirement for maintaining at least one vacant element position in a memory (or FIFO) 1100. As a consequence, only the source may set the memory full indicator (FIFO full flag), and only the drain may clear the memory full indicator (FIFO full flag). While only the source may change the write pointer (after a write has occurred), the drain can read and copy the write pointer to determine that new elements are available for reading. Similarly, only the drain may update or change the read pointer, after it has read the corresponding elements, while the source may read and copy the read pointer, to determine whether existing elements have been read and may be overwritten.

Figure 17:
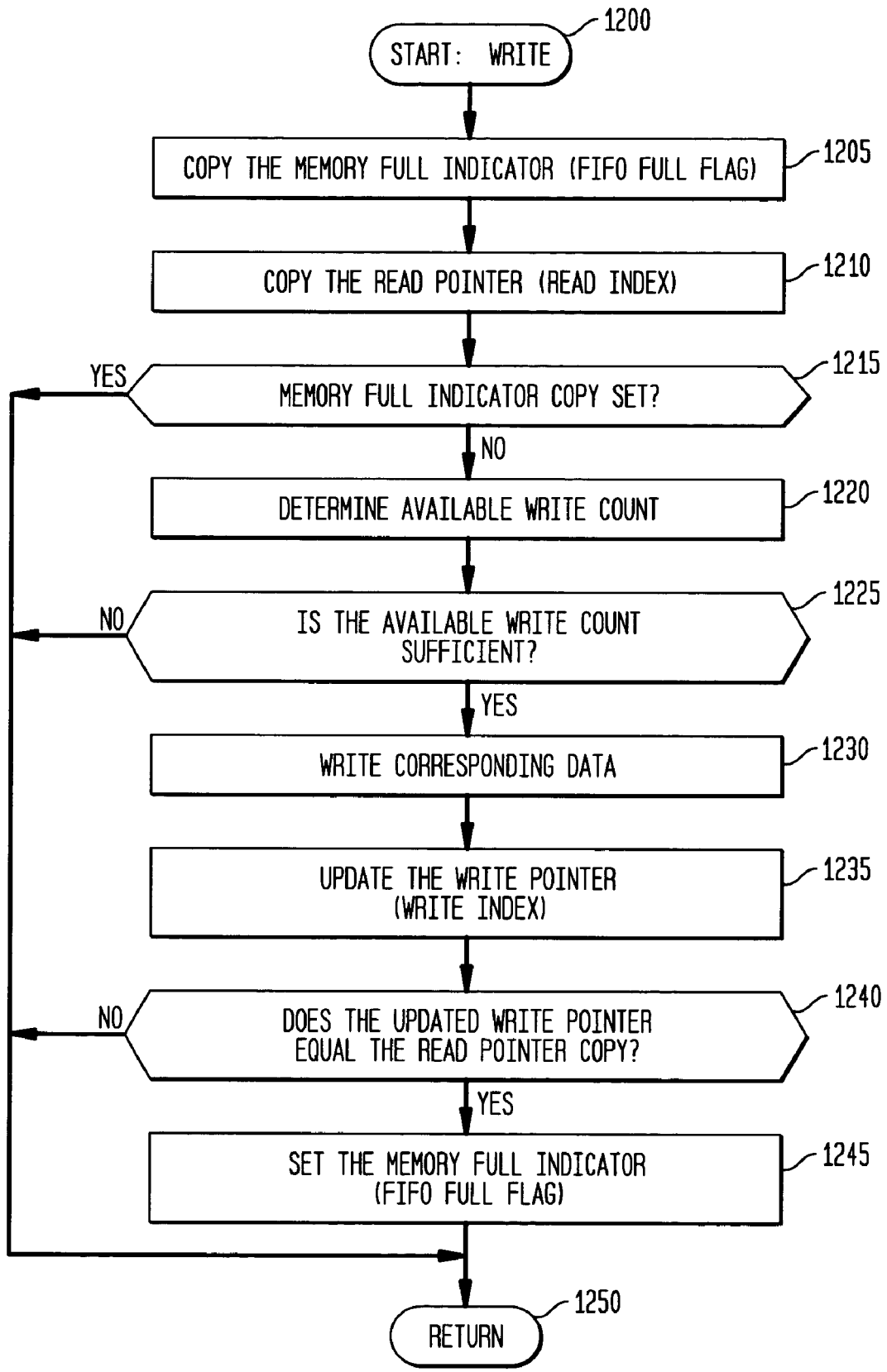
FIG. 17 is a flow diagram illustrating an exemplary data writing operation in accordance with the present invention.

FIG. 17 is a flow diagram illustrating an exemplary data writing operation in accordance with the present invention, utilized by a source (or write process) to write to the memory (or FIFO) 1100. Beginning with start step 1200, the source makes a copy of the memory full indicator (FIFO full flag) ("FFcopy"), step 1205, and obtains (reads) a copy of the read pointer or index 1110, step 1210, as a read pointer copy. Next, in step 1215, the write process (source) determines if the copy of the memory full indicator (FIFO full flag) is set. When the memory full indicator (FIFO full flag) copy is set in step 1215, the empty count available for writing, namely, the write count, is zero, and the write process may end, return step 1250. When the memory full indicator copy is not set in step 1215, the source determines an available write count, based on a difference between the read pointer 1110 copy and the write pointer 1120, step 1220. It should be noted that the determination of such a difference will generally include any effects from a memory wraparound.

In various embodiments, applications may be made responsible for determining whether there is sufficient memory space available, for a write process (or for a read process), illustrated as optional step 1225. If the available write count is insufficient, step 1225, the write process may end, return step 1250 (with the application then subsequently repeating the write process and determining at that time if there is sufficient memory space available for a write operation). Following either step 1220 (when step 1225 is not utilized) or when the available write count is sufficient in step 1225, the source may then write a corresponding amount of data (based on the available write count), step 1230, beginning with the element position currently indicated by the write pointer 1120. Following the write operation, the source (write process) updates the write pointer 1120 to indicate the next element position to which data will be written subsequently, step 1235. Following the updating of the write pointer (or index) 1120, in step 1240, the method determines if the updated write pointer is equal to the read pointer copy (obtained in step 1210). When the updated write pointer is equal to the read pointer copy in step 1240, the source sets the memory full indicator (FIFO full flag) in step 1245, indicating that the memory (or FIFO) 1100 is or might be full (depending upon what the drain may or may not have done in the interim, since the read pointer copy was obtained in step 1210). When the updated write pointer is not equal to the read pointer copy in step 1240, or following steps 1215, 1225 and 1245, the write process may end, return step 1250.

As may be apparent from the discussion above, the methodology of the present invention errs on the side of memory (or FIFO) integrity, while allowing for the read and write processes to operate both asynchronously and independently. As a consequence, the write process allows the memory full indicator to be set when the memory 1100 either is full or merely might be full. If no read process has occurred since the read pointer copy was obtained in step 1210, and if the updated write pointer is equal to the read pointer copy in step 1240, the memory 1100 is, in fact, full. If a read process has occurred since the read pointer copy was obtained in step 1210, then that read pointer copy is actually no longer accurate; as a consequence, if the updated write pointer is equal to the read pointer copy in step 1240, the memory 1100 is not, in fact, full. Nonetheless, the memory full indicator is set because, as discussed below, it is acceptable to indicate (erroneously) to the read process that the memory is full, when it is not (see step 1325, FIG. 18, discussed below). It is not acceptable, however, to indicate to the write process that the memory 1100 is not full and allow an overwrite of data elements which have not yet been read.

In addition, to prevent a possible underrun (or underflow), the copy of the read pointer 1110 is obtained prior to any write operation and update of the write pointer. If the copy of the read pointer 1110 were obtained after a write operation and write pointer update, and if the read pointer copy were equal to the updated write pointer in step 1240, the memory full indicator would be erroneously set, indicating a full memory 1100 when the memory 1100 is actually empty (the read process read the entire available read count, discussed below). This erroneous setting of the memory full indicator would indicate to the read process that the memory is full and to be read, resulting in a reading of old, meaningless or "junk" data. As a consequence, obtaining the copy of the read pointer 1110 prior to any change of the write pointer 1120, in accordance with the present invention, prevents this possible underrun.

FIG. 18 is a flow diagram illustrating an exemplary data reading operation in accordance with the present invention, utilized by a drain (or read process) to read data elements from the memory (or FIFO) 1100. Beginning with start step 1300, the drain reads the memory full indicator (FIFO full flag) to create a copy of the indicator, as a memory full indicator copy, such as a FIFO full copy ("FFcopy"), step 1305, and obtains (reads) a copy of the write pointer or index 1120, step 1310, as a write pointer copy. Next, in step 1315, the read process (or drain) determines if the copy of the memory full indicator is set. When the memory full indicator copy is not set in step 1315, the read process proceeds to step 1330 to determine an available read count. When the memory full indicator copy is set in step 1315, the read process proceeds to step 1320 and determines whether the write pointer copy and the read pointer are equal. If the write pointer copy and the read pointer are equal (step 1320) and the memory full indicator copy is set (step 1315), the read process also proceeds to step 1330 and, as the memory 1100 is full, the available read count is equal to the number of element positions in the memory 1100. To avoid a deadlock situation, if the memory full indicator copy is set in step 1315 and the write pointer copy does not equal the read index in step 1320, then the memory full indicator (FIFO full flag) is cleared, step 1325. Following steps 1315, 1320 and 1325, the method proceeds to step 1330, in which the drain will calculate an available read count as the number of occupied element positions based on (as a difference between) the write pointer copy and the read pointer. As indicated above, the available read count determination will also account for any wraparound.

Similarly, in various embodiments, applications may be made responsible for determining whether there is sufficient memory space available, for a read process (or for a write process, discussed above), illustrated as optional step 1335.

If the available read count is insufficient, step 1335, the read process may end, return step 1360 (with the application then subsequently repeating the read process and determining at that time if there is sufficient information available in the memory for a read process). Following either step 1330 (when step 1335 is not utilized) or when the available read count is sufficient in step 1335, based on the available read count, the drain reads the corresponding element positions of the memory (or FIFO) 1100, step 1340, and then the drain (as the read process implementation) updates the read pointer (or index) 1110, step 1345. The read process then checks the status of the memory full indicator copy in step 1350, and if the memory full indicator copy is set, the read process clears the memory full indicator (FIFO full flag), step 1355. Following steps 1335, 1350 or 1355, the read process may end, return step 1360.

To prevent a potential overrun situation, the read process obtains the memory full indicator copy prior to data element reading and updating the read pointer 1110. Otherwise, an intervening write process could refill the memory 1100 and set the memory full indicator, which the drain would then mistakenly clear because it had just performed a read process when, in fact, the memory 1100 is once again full. In that situation, the drain would not read the full memory 1100, losing that data, while the source would be free to overwrite the memory 1100, due to the erroneous indication that it is not full (cleared memory full indicator). As a consequence, obtaining the copy of the memory full indicator prior to any read process and change of the read pointer 1110, in accordance with the present invention, prevents this possible overrun.

In addition, to avoid a potential underrun situation, the read process utilizes the write pointer copy obtained in step 1310 to determine the available read count. While additional data may be available due to an intervening write process, the methodology errs on the side of avoiding a potential read of old or meaningless data, such that any additional data written while the current read process is occurring is simply read during the next read cycle.

The present invention also provides for "push back" after a memory 1100 read, for applications in which it is desirable to "unread" some elements previously read from the memory 1100, referred to as a memory (or FIFO) read and rewrite process (or push back). For example, in packet framing in MPEG2 transport stream demultiplexing, the packet framing process scans the byte stream looking for the sync byte (0×47) that occurs at the beginning of each 188-byte packet. Once the sync byte is reliably detected at 188-byte intervals, the processing can begin on the transport packets. If, for example, the sync byte is detected at the $10^{th}$ byte position of a buffer, it may be convenient to push back the sync byte and all following bytes so that the next buffer read from the memory (or FIFO) 1100 will be aligned with (i.e., start with) the sync byte.

As discussed in greater detail below, for a memory (or FIFO) 1100 push back, the buffer read count is decremented by a corresponding number of bytes or elements, as the read pointer is correspondingly adjusted (decremented), to provide the selected alignment. In addition, depending upon the embodiment of the memory (or FIFO) 1100, to support the push back, the data which has been read may have to be rewritten, because for certain types of memory, the data in the memory is removed or destroyed in the actual read process.

Figure 19A:
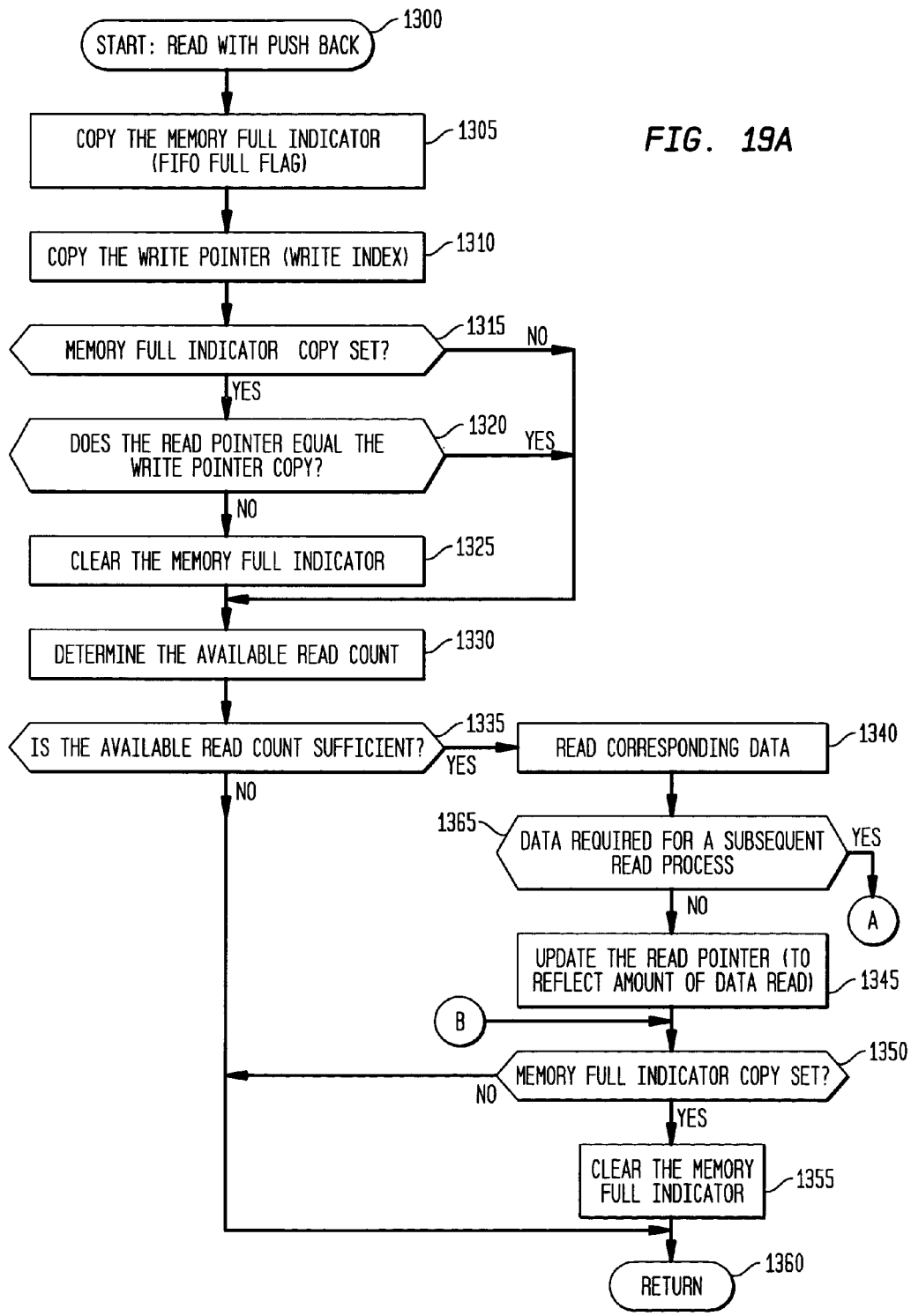

FIG. 19 is a flow diagram illustrating this memory read and rewrite process in accordance with the present invention, and illustrates how the memory push back may be integrated with the read process illustrated in FIG. 18. As illustrated in FIG. 19, many steps of the memory read and rewrite process are utilized in common with the read method of FIG. 18 and are illustrated with the same step numbers. In the interests of brevity, the discussion above concerning those steps is incorporated herein by reference.

Referring to FIG. 19, following the reading of data elements (step 1340), the drain determines whether any of the data elements which have been read would be suitable or required to be read again in a subsequent read process, step 1365. For example, while not a requirement, it may be useful to perform the read push back for synchronization purposes, as discussed above. If no subsequent re-reading is selected in step 1365, the read process may continue as discussed previously, proceeding to step 1345 to update the read pointer (or index). When subsequent re-reading is selected in step 1365, the drain identifies the data elements (for subsequent reading) and the starting element position for those elements (i.e., identifies the data and the starting location for the data in memory 1100), step 1370. The push back read process then determines whether the selected data elements should be re-written to memory 1100, step 1375. As mentioned above, this determination is generally a function of the physical type and characteristics of the memory utilized to embody memory 1100. When a memory 1100 rewrite is selected in step 1375, the push back read process performs a write operation (i.e., the drain temporarily becomes a source), writing the selected data elements at the corresponding element positions in the memory 1100, step 1380. (It should be noted that this write operation is equivalent to step 1230 only and is not the complete write process discussed above, e.g., no modification of a write pointer or index is performed, setting of the memory full indicator is not determined, etc.). Following step 1380, or when a rewrite is not selected in step 1375, the push back read process updates the read pointer to reflect the push back, namely, updating the read pointer only to the point where the next element to be read is the start of the selected data elements, step 1385. Following step 1385, the push back read process may continue with determining whether the memory full indicator (FIFO full flag) copy was set, step 1350 and subsequent steps, as discussed above.

In another embodiment, the push back read process may be performed separately from and subsequent to the read process. For example, subsequent to the read process of FIG. 18, the drain may determine that a subsequent read of selected data elements is desired. In that event, steps 1365 through 1385 may be performed, with the updating of the read pointer of step 1385 then decrementing a previously advanced read pointer. In this embodiment, however, if the read pointer had previously been updated without accounting for the push back, there is a risk that an intervening write from a source could occur. As a consequence, given asynchronous and independent read and write processes, it is preferable to perform the push back determination and push back read process prior to any updating of the read pointer.

Applications which may be sensitive to a potential (and temporary) false FIFO empty should be considered in determining whether the memory (or FIFO) 1100 will be allowed to be full. When the memory (or FIFO) 1100 is filled to capacity, there may be a brief period of time when the read pointer 1110 and the write pointer 1120 are equal, but the FIFO full flag had not yet been set. During this time period (between steps 1235 and 1245), the read process will consider the memory (or FIFO) to be empty. This is generally not an issue, as the drain will not read the erroneously "empty" memory and will subsequently check the memory (or FIFO) 1100 again and receive the correct indication that the memory (or FIFO) is full. There may be applications, however, in which an empty memory (or FIFO) is considered an error condition. For these applications, the corresponding read and write operations should be programmed so that the memory (or FIFO) 1100 is never full, which guarantees that there is no false FIFO full situation (e.g., by providing that the actual write count is always one element less (x−1) than the available write count (x)).

In summary, the present invention provides a system and method for controlling independent and asynchronous access to a memory by a plurality of processes. The system includes a memory, a first node and a second node (both coupled to the memory), such as a node 800, a K-node 925, a host processor (coupled via system I/O 910) or another form of finite state machine (e.g., a processor (or microprocessor), a DSP, a controller, a microcontroller, and so on). The first node and the second node may be selected from a plurality of nodes, such as the plurality of nodes comprising one or more of the following node types: an adaptive computing node, a kernel node (K-node), a processor, and a finite state machine. The first node is capable of independently and asynchronously performing a memory read process of the plurality of processes, while the second node is capable of independently and asynchronously performing a memory write process.

The first node, as a drain, performs the read process by: (1) obtaining a (first) copy of a memory full indicator (step 1305); (2) obtaining a copy of a write index (step 1310), with the write index indicating a write element position in the memory; (3) determining an available read count from the write index copy and a read index (step 1330), with the read index indicating a read element position in the memory; (4) beginning at the read element position, reading a plurality of data elements corresponding to the available read count (generally, an amount of data which is less than or equal to the available read count) (step 1335); and (5) updating the read index to indicate a next read element position (step 1340 or 1380). The read index may be updated to indicate the next read element position based upon the plurality of data elements read (step 1340), or to another element position selected for a subsequent read operation (a push back) (step 1380). In addition, when the copy of the memory full indicator indicates that the memory is full or may be full (step 1345), the first node is capable of clearing the memory full indicator to indicate that the memory is not full (step 1350); and when the memory full indicator copy indicates that the memory is full or may be full (1315) and the write index copy is not equal to the read index (1320), the first node is capable of clearing the memory full indicator to indicate that the memory is not full (1325).

The first node is also capable of a push back read process (step 1360), in which prior to updating the read index, the first node is further capable of selecting a data element from the plurality of data elements for a subsequent read process, and determining a corresponding element position of the data element in the memory as the next read element position (step 1365). When a re-write may also be needed depending upon the type of memory (step 1370), also prior to updating the read index, the first node is further capable of selecting a subset of data elements from the plurality of data elements for a subsequent read process (step 1365); determining an element position corresponding to an initial data element of the subset of data elements in the memory, as the next read element position and as a next write element position (step 1365); and commencing at the next write element position, writing the subset of data elements to the memory (and, importantly, without modifying the write index) (step 1375).

The second node is capable of independently and asynchronously performing a memory write process, of the plurality of processes, by (1) obtaining a (second) copy of a memory full indicator (step 1205) and obtaining a copy of the read index (step 1210); (2) when the memory full indicator copy indicates that the memory is not full (step 1215), the second node is further capable of determining an available write count from the read index copy and a write index (step 1220); (3) beginning at the write element position, the second node is further capable of writing an amount of data corresponding to the available write count (generally an amount of data which is less than or equal to the available write count) (step 1225); and (4) updating the write index to indicate a next write element position based upon the amount of data written (step 1230). The second node is further capable of determining whether the updated write index is equal to the read index copy (step 1235), and when the updated write index is equal to the read index copy, the second node is further capable of setting the memory full indicator to indicate that the memory is full or may be full (step 1240).

The present invention allows for asynchronous and independent access to a shared memory resource by more than one process, without separately requiring a mutual exclusion process implemented in either hardware or software. Memory or FIFO overflow, in which a source writes over data which the drain has not yet read, is prevented. Similarly, memory or FIFO underflow, in which the drain reads old or bad data, is also prevented. The present invention further provides for a "push back" read process, in which some or all data which has been read may also be read again, such as for synchronization purposes.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method of controlling independent and asynchronous access to a memory by a plurality of processes, the method comprising:

independently and asynchronously performing a memory write process of the plurality of processes, wherein the memory write process comprises:
  obtaining a first copy of a memory full indicator;
  obtaining a copy of a read index, the read index copy indicating a read element position in the memory;
  when the first copy of the memory full indicator indicates that the memory is not full, determining an available write count from the read index copy and a write index, the write index indicating a write element position in the memory;
  beginning at the write element position, writing an amount of data corresponding to the available write count;
  updating the write index to indicate a next write element position based upon the amount of data written; and independently and asynchronously performing a memory read process of the plurality of processes, wherein the memory read process comprises:

obtaining a second copy of the memory full indicator;
obtaining a copy of the write index;
determining an available read count from the read index and the write index copy;
beginning at the read element position, reading a plurality of data elements corresponding to the available read count;
selecting a data element of the plurality of data elements for a subsequent read process;
determining a corresponding element position of the data element in the memory as a next read element position; and
updating the read index to indicate the next read element position for the subsequent read process.

2. The method of claim 1, further comprising:
determining whether the updated write index is equal to the read index copy.

3. The method of claim 2, further comprising:
when the updated write index is equal to the read index copy, setting the memory full indicator to indicate that the memory is full or may be full.

4. The method of claim 1, wherein the amount of data corresponding to the available write count is an amount of data which is less than or equal to the available write count.

5. The method of claim 1, wherein the memory read process comprises:
obtaining a second copy of the memory full indicator;
obtaining a copy of the write index;
determining an available read count from the read index and the write index copy;
beginning at the read element position, reading an amount of data corresponding to the available read count; and
updating the read index to indicate a next read element position based on the amount of data read.

6. The method of claim 5, further comprising:
subsequent to updating the read index, when the second copy of the memory full indicator indicates that the memory is full or may be full, clearing the memory full indicator to indicate that the memory is not full.

7. The method of claim 5, further comprising:
prior to determining the available read count, when the second copy of the memory full indicator indicates that the memory is full or may be full, and when the write index copy is not equal to the read index, clearing the memory full indicator to indicate that the memory is not full.

8. The method of claim 5, wherein the amount of data corresponding to the available read count is an amount of data which is less than or equal to the available read count.

9. The method of claim 1, wherein the memory read process further comprises:
obtaining a second copy of the memory full indicator;
obtaining a copy of the write index;
determining an available read count from the read index and the write index copy;
beginning at the read element position, reading a plurality of data elements corresponding to the available write count;
selecting a subset of data elements from the plurality of data elements for a subsequent read process;
determining an element position corresponding to an initial data element of the subset of data elements in the memory, as a next read element position and as a next write element position;
commencing at the next write element position, writing the subset of data elements to the memory; and
updating the read index to indicate the next read element position for the subsequent read process.

10. The method of claim 9, wherein the writing of the subset of data elements to the memory is performed without modification of the write index.

11. A system for controlling independent and asynchronous access to a memory by a plurality of processes, the system comprising:
a memory;
a first node coupled to the memory, the first node capable of independently and asynchronously performing a memory read process of the plurality of processes; and
a second node coupled to the memory, the second node capable of independently and asynchronously performing a memory write process, of the plurality of processes, by obtaining a first copy of a memory full indicator and obtaining a copy of a read index, the read index copy indicating a read element position in the memory; when the first copy of the memory full indicator indicates that the memory is not full, the second node further capable of determining an available write count from the read index copy and a write index, the write index indicating a write element position in the memory; beginning at the write element position, the second node further capable of writing an amount of data corresponding to the available write count and updating the write index to indicate a next write element position based upon the amount of data written;
wherein the first node is capable of forming the memory read process by obtaining a second copy of the memory full indicator and obtaining a copy of the write index; determining an available read count from the read index and the write index copy; beginning at the read element position, reading a plurality of data elements corresponding to the available read count; and wherein the first node is further capable of selecting a data element of the plurality of data elements for a subsequent read process; determining a corresponding element position of the data element in the memory as a next read element position; and updating the read index to indicate the next read element position for the subsequent read process.

12. The system of claim 11, wherein the second node is further capable of determining whether the updated write index is equal to the read index copy.

13. The system of claim 12, wherein when the updated write index is equal to the read index copy, the second node is further capable of setting the memory full indicator to indicate that the memory is full or may be full.

14. The system of claim 11, wherein the amount of data corresponding to the available write count is an amount of data which is less than or equal to the available write count.

15. The system of claim 11, wherein the first node is further capable of obtaining a second copy of the memory full indicator and obtaining a copy of the write index; determining an available read count from the read index and the write index copy; beginning at the read element position, reading an amount of data corresponding to the available read count; and wherein the first node is further capable of updating the read index to indicate a next read element position based on the amount of data read.

16. The system of claim 15, wherein subsequent to updating the read index, when the second copy of the memory full indicator indicates that the memory is full or may be full, the first node is further capable of clearing the memory full indicator to indicate that the memory is not full.

17. The system of claim 15, wherein prior to determining the available read count, when the second copy of the memory full indicator indicates that the memory is full or may be full, and when the write index copy is not equal to the read index, the first node is further capable of clearing the memory full indicator to indicate that the memory is not full.

18. The system of claim 15, wherein the amount of data corresponding to the available read count is an amount of data which is less than or equal to the available read count.

19. The system of claim 11, wherein the first node is capable of obtaining a second copy of the memory full indicator and obtaining a copy of the write index; determining an available read count from the read index and the write index copy; beginning at the read element position, reading a plurality of data elements corresponding to the available write count; selecting a subset of data elements from the plurality of data elements for a subsequent read process; wherein the first node is further capable of determining an element position corresponding to an initial data element of the subset of data elements in the memory, as a next read element position and as a next write element position; commencing at the next write element position, writing the subset of data elements to the memory; and updating the read index to indicate the next read element position for the subsequent read process.

20. The system of claim 19, wherein the first node is further capable of writing the subset of data elements to the memory without modification of the write index.

21. The system of claim 11, wherein the first node and the second node are selected from a plurality of nodes, the plurality of nodes comprising one or more of the following node types: an adaptive computing node, a kernel node, a processor, and a finite state machine.

22. A method of controlling independent and asynchronous access to a memory by a plurality of processes, the method comprising:
while providing for independent and asynchronous performance of a memory write process of the plurality of processes, independently and asynchronously performing a memory read process of the plurality of processes, wherein the memory read process comprises:
obtaining a first copy of a memory full indicator;
obtaining a copy of a write index, the write index indicating a write element position in the memory;
determining an available read count from the write index copy and a read index, the read index indicating a read element position in the memory;
beginning at the read element position, reading a plurality of data elements corresponding to the available read count;
selecting a data element from the plurality of data elements for a subsequent read process; and
determining a corresponding element position of the data element in the memory as a next read element position;
updating the read index to indicate the next read element position.

23. The method of claim 22, wherein the updating of the read index to indicate the next read element position is based upon the plurality of data elements read.

24. The method of claim 22, further comprising:
subsequent to updating the read index, when the first copy of the memory fill indicator indicates that the memory is full or may be full, clearing the memory full indicator to indicate that the memory is not full.

25. The method of claim 22, further comprising:
prior to determining the available read count, when the first copy of the memory full indicator indicates that the memory is full or may be full, and when the write index copy is not equal to the read index, clearing the memory full indicator to indicate that the memory is not full.

26. The method of claim 22, wherein the plurality of data elements corresponding to the available read count is an amount of data which is less than or equal to the available read count.

27. The method of claim 22, further comprising:
prior to updating the read index, selecting a subset of data elements from the plurality of data elements for a subsequent read process;
determining an element position corresponding to an initial data element of the subset of data elements in the memory, as the next read element position and as a next write element position; and
commmencing at the next write element position, writing the subset of data elements to the memory.

28. The method of claim 27, wherein the writing of the subset of data elements to the memory is performed without modification of the write index.

29. The method of claim 22, wherein the memory write process further comprises:
obtaining a second copy of the memory full indicator;
obtaining a copy of the read index;
when the second copy of the memory full indicator indicates that the memory is not full, determining an available write count from the read index copy and the write index;
beginning at the write element position indicated by the write index, writing an amount of data corresponding to the available write count; and
updating the write index to indicate a next write element position based upon the amount of data written.

30. The method of claim 29, further comprising:
determining whether the updated write index is equal to the read index copy.

31. The method of claim 30, further comprising:
when the updated write index is equal to the read index copy, setting the memory full indicator to indicate that the memory is full or may be full.

32. The method of claim 29, wherein the amount of data corresponding to the available write count is an amount of data which is less than or equal to the available write count.

33. A system for controlling independent and asynchronous access to a memory by a plurality of processes, the system comprising:
a memory;
a first node coupled to the memory, the first node capable of independently and asynchronously performing a memory write process of the plurality of processes; and
a second node coupled to the memory, the second node capable of independently and asynchronously performing a memory read process, of the plurality of processes, by obtaining a first copy of a memory full indicator and obtaining a copy of a write index, the write index indicating a write element position in the memory; determining an available read count from the write index copy and a read index, the read index indicating a read element position in the memory; beginning at the read element position, reading a plurality of data elements corresponding to the available read count; selecting a data element from the plurality of data elements for a subsequent read process; determining a corresponding element position of the data element in the memory as a next read element position; and updating the read index to indicate the next read element position.

34. The system of claim 33, wherein the second node is further capable of updating the read index to indicate the next read element position based upon the plurality of data elements read.

35. The system of claim 33, wherein subsequent to updating the read index, the second node is further capable, when the first copy of the memory full indicator indicates that the memory is full or may be full, of clearing the memory full indicator to indicate that the memory is not full.

36. The system of claim 33, wherein prior to determining the available read count, the second node is further capable, when the first copy of the memory full indicator indicates that the memory is full or may be full when the write index copy is not equal to the read index, of clearing the memory full indicator to indicate that the memory is not full.

37. The system of claim 33, wherein the plurality of data elements corresponding to the available read count is an amount of data which is less than or equal to the available read count.

38. The system of claim 33, wherein prior to updating the read index, the second node is further capable of selecting a subset of data elements from the plurality of data elements for a subsequent read process; determining an element position corresponding to an initial data element of the subset of data elements in the memory, as the next read element position and as a next write element position; and commencing at the next write element position, writing the subset of data elements to the memory.

39. The system of claim 38, wherein the second node is further capable of writing the subset of data elements to the memory without modifying the write index.

40. The system of claim 33, wherein the first node is further capable of obtaining a second copy of the memory full indicator and obtaining a copy of the read index; when the second copy of the memory full indicator indicates that the memory is not full, determining an available write count from the read index copy and the write index; beginning at the write element position indicated by the write index, writing an amount of data corresponding to the available write count; and updating the write index to indicate a next write element position based upon the amount of data written.

41. The system of claim 40, wherein the first node is further capable of determining whether the updated write index is equal to the read index copy.

42. The system of claim 41, wherein the first node is further capable, when the updated write index is equal to the read index copy, of setting the memory full indicator to indicate that the memory is full or may be full.

43. The system of claim 40, wherein the amount of data corresponding to the available write count is an amount of data which is less than or equal to the available write count.

44. The system of claim 33, wherein the first node and the second node are selected from a plurality of nodes, the plurality of nodes comprising one or more of the following node types: an adaptive computing node, a kernel node, a processor, and a finite state machine.

45. A system for controlling independent and asynchronous access to a memory by a plurality of processes, the system comprising:

a memory;

a first node coupled to the memory, the first node independently and asynchronously capable of obtaining a first copy of a memory full indicator and obtaining a copy of a write index, the write index indicating a write element position in the memory; determining an available read count from the write index copy and a read index, the read index indicating a read element position in the memory; beginning at the read element position, reading a plurality of data elements corresponding to the available read count; the first node further capable of selecting a subset of data elements from the plurality of data elements for a subsequent read process and when selected, determining an element position corresponding to an initial data element of the subset of data elements in the memory, as a next read element position and as a next write element position, and commencing at the next write element position, writing the subset of data elements to the memory; and the first node further capable of updating the read index to indicate the next read element position and, when the first copy of the memory full indicator indicates that the memory is full or may be full, clearing the memory full indicator to indicate that the memory is not full; and a second node coupled to the memory, the second node independently and asynchronously capable of obtaining a second copy of the memory full indicator and obtaining a copy of the read index; when the second copy of the memory full indicator copy indicates that the memory is not full, determining an available write count from the read index copy and the write index; beginning at the write element position indicated by the write index, writing an amount of data corresponding to the available write count; updating the write index to indicate a next write element position based upon the amount of data written; and when the updated write index is equal to the read index copy, of setting the memory full indicator to indicate that the memory is full or may be full.

* * * * *

UNITED STATES PATENT AND TRADEMARK OFFICE
CERTIFICATE OF CORRECTION

| | | |
|---|---|---|
| PATENT NO. | : 7,174,432 B2 | Page 1 of 1 |
| APPLICATION NO. | : 10/644621 | |
| DATED | : February 6, 2007 | |
| INVENTOR(S) | : Howard et al. | |

It is certified that error appears in the above-identified patent and that said Letters Patent is hereby corrected as shown below:

In column 34, line 30, replace "forming" with --performing--

In column 37, line 17, replace "full when" with --full and when--

Signed and Sealed this

Twenty-second Day of May, 2007

JON W. DUDAS
*Director of the United States Patent and Trademark Office*